US00RE40067E

(19) United States
(12) Reissued Patent
Gondouin

(10) Patent Number: US RE40,067 E
(45) Date of Reissued Patent: *Feb. 19, 2008

(54) DOWNHOLE EQUIPMENT TOOLS AND ASSEMBLY PROCEDURES FOR THE DRILLING, TIE-IN AND COMPLETION OF VERTICAL CASED OIL WELLS CONNECTED TO LINER-EQUIPPED MULTIPLE DRAINHOLES

(75) Inventor: Michel Gondouin, San Rafael, CA (US)

(73) Assignee: Halliburton Energy Services, Inc., Dallas, TX (US)

( * ) Notice: This patent is subject to a terminal disclaimer.

(21) Appl. No.: 11/038,005

(22) Filed: Apr. 8, 2005

Related U.S. Patent Documents

Reissue of:
(64) Patent No.: 5,462,120
Issued: Oct. 31, 1995
Appl. No.: 07/814,585
Filed: Jan. 4, 1993

U.S. Applications:
(63) Continuation of application No. 09/956,806, filed on Sep. 21, 2001, now Pat. No. Re. 39,141, and a continuation of application No. 08/861,457, filed on May 22, 1997, now Pat. No. Re. 37,867.

(51) Int. Cl.
*E21B 7/04* (2006.01)

(52) U.S. Cl. ..... 166/380; 166/50; 166/117.6; 166/242.1; 166/313; 175/61; 175/79

(58) Field of Classification Search ..... 166/380, 166/50, 117.6, 61, 242.1, 313, 369, 117.5, 166/242.5, 242.6, 242.7
See application file for complete search history.

(56) References Cited

U.S. PATENT DOCUMENTS 698,020 A * 4/1902 Huffman ..... 166/380

(Continued)

N

FOREIGN PATENT DOCUMENTS

GB 2282835 4/1995

(Continued)

OTHER PUBLICATIONS

David Ackert, Manfred Boetel, Toni Marzalek, Christian Clavier, Peter Goode, Michael Thambynayagam and Ted Stagg, Looking Sideways for Oil, The Technical Review, vol. 36, No. 1, pp. 22–31, undated.

(Continued)

*Primary Examiner*—Hoang Dang
(74) *Attorney, Agent, or Firm*—Finnegan, Henderson, Farabow, Garrett & Dunner, L.L.P.

(57) ABSTRACT

Single horizontal wells drilled through heterogeneous reservoirs are capable of greater oil productivity than vertical wells, often with lower produced GOR and WOR. Multiple drainholes tied-in to a vertical cased well are even more beneficial. Completion of such drainholes in many sandy reservoirs must use cemented liners. Well configurations comprising multiple drainholes liners, each of them tied-in to a vertical casing by pressure-tight connections require novel technologies making use of some novel downhole equipment, tools and procedures for drilling, tie-in and completion of such wells. These may be for newly-drilled wells or may be obtained by re-entry into an existing vertical cased well. Specific equipment, including novel casing joints, whipstocks, intermediate liners and tubing completion assembly components applicable to new wells are described herein. Equipment comprising novel casing inserts and patches applicable to re-entry wells, and the corresponding tubing completion assembly components for a variety of well exploitation modes are also described, together with the required tools and procedures. The liners of the drainholes are such that known well logging and cleaning tools may be used throughout the well's life. The various tubing completion assemblies can all be run-in and installed in a single trip. They allow either commingled flow from all drainholes or selective injection into some drainholes while others are under production. They are adapted to a variety of reservoir pressure conditions and of oil types, including heavy oil produced by sequential "huff and puff" steam injection.

18 Claims, 31 Drawing Sheets

(CANCELED)

U.S. PATENT DOCUMENTS 1,507,717 A 9/1924 Rich
1,520,737 A 12/1924 Wright
1,734,033 A 11/1929 Geis
1,735,012 A 11/1929 Rich
1,804,819 A 5/1931 Spencer et al.
1,816,260 A 7/1931 Lee ..... 166/50
1,900,163 A 3/1933 Dana
1,900,164 A 3/1933 Dana et al.
1,901,454 A 3/1933 Kelly
1,923,448 A 8/1933 McCoy et al.
2,032,509 A 3/1936 Shanor
2,043,225 A 6/1936 Armentrout et al.
2,058,327 A 10/1936 Lane
2,118,650 A 5/1938 Lee
2,147,537 A 2/1939 Lowrey
2,155,129 A 4/1939 Hall et al.
2,164,266 A 6/1939 Armentrout et al.
2,171,416 A 8/1939 Lee
2,173,035 A 9/1939 Armentrout et al.
2,198,016 A 4/1940 Rogers et al.
2,205,119 A 6/1940 Hall et al.
2,211,803 A 8/1940 Warburton
2,271,005 A 1/1942 Grebe
2,281,414 A 4/1942 Clark
2,281,801 A 5/1942 Reynolds et al.
2,297,029 A 9/1942 Shepard et al.
2,324,682 A 7/1943 Long
2,331,293 A 12/1943 Ballard
2,383,496 A 8/1945 Nebolsine
2,386,514 A 10/1945 Stokes
2,397,070 A 3/1946 Zublin ..... 166/50
2,404,341 A 7/1946 Zublin
2,434,239 A 1/1948 Zublin
2,452,920 A 11/1948 Gilbert
2,456,331 A 12/1948 Sewell
2,492,079 A 12/1949 Wiley ..... 166/117.5
2,504,462 A 4/1950 Sprague et al.
2,642,267 A 6/1953 Zublin
2,669,430 A 2/1954 Zublin
2,696,264 A 12/1954 Colmerauer et al.
2,707,997 A 5/1955 Zandmer et al.
2,726,847 A 12/1955 McCune et al.
2,788,956 A 4/1957 Pevere et al.
2,797,893 A 7/1957 McCune et al.
2,804,926 A 9/1957 Zublin
2,821,362 A 1/1958 Hatcher
2,857,002 A 10/1958 Pevere et al.
2,858,107 A 10/1958 Colmerauer
3,064,729 A 11/1962 Lindley
3,120,268 A 2/1964 Caldwell
3,159,214 A 12/1964 Carter
3,223,158 A 12/1965 Baker
3,285,335 A 11/1966 Reistle, Jr.
3,301,337 A 1/1967 Vaughn et al.
3,330,349 A 7/1967 Owsley et al. ..... 166/117.5 X
3,330,360 A 7/1967 Bielstein et al.
3,419,089 A 12/1968 Venghiattis
3,587,743 A 6/1971 Howard
3,690,380 A 9/1972 Grable et al.
3,842,912 A 10/1974 Lindsey
3,918,522 A 11/1975 Suman, Jr.
3,938,592 A 2/1976 Aladiev et al.
4,007,797 A 2/1977 Jeter
4,022,279 A 5/1977 Driver
4,068,729 A 1/1978 Peevey
4,099,783 A 7/1978 Verty et al.
4,153,109 A 5/1979 Szescila
4,160,481 A 7/1979 Turk et al.
4,182,423 A 1/1980 Ziebarth et al.
4,222,611 A 9/1980 Larson et al.
4,249,777 A 2/1981 Morrell et al.
4,258,800 A 3/1981 Hipp
4,279,301 A 7/1981 Williams
4,285,399 A 8/1981 Holland et al.
4,304,299 A 12/1981 Holland et al.
4,317,492 A 3/1982 Summers et al.
4,396,075 A 8/1983 Wood et al. ..... 175/79
4,396,230 A 8/1983 Wood et al. ..... 166/313 X
4,397,355 A 8/1983 McLamore
4,397,360 A 8/1983 Schmidt
4,402,551 A 9/1983 Wood et al.
4,415,205 A 11/1983 Rehm et al. ..... 166/50 X
4,436,165 A 3/1984 Emery
4,444,276 A 4/1984 Peterson
4,489,782 A 12/1984 Perkins ..... 166/50 X
4,519,463 A 5/1985 Schuh
4,523,652 A 6/1985 Schuh
4,550,781 A 11/1985 Kagler, Jr.
4,554,982 A 11/1985 Burton
4,573,540 A 3/1986 Dellinger
4,573,541 A 3/1986 Josse et al. ..... 166/117.5 X
4,601,353 A 7/1986 Schuh et al.
4,605,076 A 8/1986 Goodhart
4,646,836 A 3/1987 Goodhart
4,696,345 A 9/1987 Hsueh
4,714,117 A 12/1987 Dech
4,742,871 A 5/1988 Miffre ..... 166/117.5
4,771,830 A 9/1988 Peate
4,807,704 A 2/1989 Hsu et al.
4,852,666 A 8/1989 Brunet
4,928,767 A 5/1990 Jeisma
5,038,859 A 8/1991 Lynde et al.
5,052,482 A 10/1991 Gondouin ..... 166/50
5,085,275 A 2/1992 Gondouin ..... 166/303
5,109,924 A 5/1992 Jurgens et al.
5,115,872 A 5/1992 Brune et al. ..... 166/117.5 X
5,127,457 A 7/1992 Stewart et al. ..... 166/50 X
5,148,877 A 9/1992 MacGregor
5,224,556 A 7/1993 Wilson et al.
5,289,876 A 3/1994 Graham
5,301,760 A 4/1994 Graham
5,318,121 A 6/1994 Brockman et al.
5,318,122 A 6/1994 Murray et al.
5,322,127 A 6/1994 McNair et al.
5,325,924 A 7/1994 Bangert et al.
5,337,808 A 8/1994 Graham
5,353,876 A 10/1994 Curington et al.
5,388,648 A 2/1995 Jordan, Jr.

FOREIGN PATENT DOCUMENTS

GB 2295840 6/1996
SU 787 611 12/1980

OTHER PUBLICATIONS

Ahmed, U., Horizontal Well Completion Recommendations Through Optimized Formation Evaluation, SPE 22992, Nov. 4, 1991, pp. 423–435.

U. Ahmed and S. Jacobsen, Practical Aspects of Horizontal Well Technology: A Perspective, SPE 21260, undated.

S.A. Andersen, S.A. Hansen, and K. Fjeldgaard, Horizontal Drilling and Completion: Denmark, SPE 18349, pp. 155–165, undated.

Svend Aage Andersen, John M. Conlin, Kjeld Fjeldgaard, Exploiting Reservoirs with Horizontal Wells: The Maersk Experience, Oilfield Review, vol. 2, No. 3, pp. 11–21.

J.P. Ashton, J. Liput, R. Lemons, and J. Summerlin, Gravel Packing Horizontal and Highly Deviated Openhole Completions Using a Single–Screen Prepacked Liner in Offshore California Fields, SPE 19718, pp. 165–178, undated.

Fred L. Babins, Problems in Cementing Horizontal Wells, Reservoir Selection for Horizontal Wells, pp. 1–8, undated.
Tony Beckett and Lee Hoffpauir, Test Off Philippines Boosts Horizontal Drilling Technology, Petroleum Engineer International, Nov. 1989, pp. 24, 25, 26, 28, 30, 32.
Peter Betts, Curt Blount, Bill Broman, Brian Clark, Larry Hibbard, Alain Louis and Paul Oosthoek, Acquiring and Interpreting Logs in Horizontal Wells, Oilfield Review, vol. 2, No. 3., pp. 34–51, undated.
W.B. Bradley, C.E. Murphey, R.T. McLamore, and L.L. Dickson, Advantages of Heavy Metal Collars in Directional Drilling and Deviation Control, Journal of Petroleum Technology, May 1976, pp. 521–530.
Gary M. Briggs, How to Design a Medium–Radius Horizontal Well, Petroleum Engineer International, Sep. 1989, pp. 26, 30, 31, 32, 36, 37.
Ernie Brown, Ron Thomas, Arthur Milne, The Challenge of Completing and Stimulating Horizontal Wells, Oilfield Review, vol. 2., No. 3., pp. 52–63, undated.
J. Bryant, D. Watson, W. Wisniewski, R. Patterson and L. Smith, Applicatons and Limitations of Horizontal Drilling in Oklahoma, SPE 22569, pp. 313–326, undated.
D. Bryant, T. Hudson, and S. Hoover, Use of Low–Density Particles for Packing a Highly Deviated Well, SPE 20984, pp. 387–395, undated.
Trevor Burgess and Patrick Van De Slijke, Horizontal Drilling Comes of Age, Oilfield Review, vol. 2, No. 3, pp. 22–33, undated.
Richard S. Carden, Air Drilling Has Some Pluses for Horizontal Wells, Oil & Gas Journal, Apr. 8, 1991, pp. 76–78.
Correspondence, from Matt W. Carson to William E. Shull, Dec. 2, 1996.
Christensen, Axel, Recent Achievements in Drilling and Completion of Multiple Lateral Drainholes in Chalk Reservoirs, Customer Presentation?, 1992.
D.B. Christian, Planning and Operational Requirements for a Shallow–Objective, High–Angle Well in the Gulf of Mexico, SPE Drilling Engineering, Sep. 1988, pp. 241–247.
Gavin Clark, Piyush Shah, Bruno Deruyck, D.K. Gupta and S.K. Sharma, Horizontal Well Testing in India, Oilfield Review, vol. 2, No. 3, pp. 64–67, undated.
S.B. Claytor, K.J. Manning and D.L. Schmalzried, Drilling a Medium–Radius Horizontal Wells with Aerated Drilling Fluid: A Case Study, SPE/IADC 21988, pp. 759–773, undated.
S.B. Claytor Jr. and J. Speed, Steerable Systems Drilling: The Right Angle for Horizontal Drilling, SPE 19466, pp. 7–16, undated.
R.L. Cook, J.W. Nicholson, M.G. Sheppard and W. Westlake, First Real Time Measurements of Downhole Vibrations, Forces, and Pressure Used to Monitor Directional Drilling Operations, SPE/IADC 18651, pp. 283–290, undated.
M.F. Cooney, T. Rogers, E.S. Stacey and R.N. Stephens, Case History of an Opposed–Bore, Dual Horizontal Well in the Austin Chalk Formation of South Texas, SPE/IADC 21985, pp. 737–748, undated.
R.E. Cooper, Coiled Tubing in Horizontal Wells, SPE 17581, pp. 323–334, undated.
R.E. Cooper and J.C. Troncoso, An Overview of Horizontal Well Completion Technology, SPE 17582, pp. 335–350, undated.
Kevin T. Corbett and Rapier Dawson, Drillstring Design for Directional Wells, Technology, Apr. 30, 1984, Oil & Gas Journal, pp. 61–66.
D.D. Cramer, Guides Exist for Fracture Treatment in Horizontal Wells, OGJ Special, Mar. 27, 1989, Oil & Gas Journal, pp. 41, 44, 46, 48, 49.
A. Damgaard, D.S. Bangert, D.J. Murray, R.P. Rubbo and G.W. Stout, A Unique Method for Perforating, Fracturing and Competing Horizontal Wells, SPE 19282, undated.
Dennis Dann and David Jetelina, New Logging Approach Detects Fractures in Horizontal Wells, Petroleum Engineer International Sep. 1990, pp. 30, 32, 33, 35, 36.
James A. Dech, David D. Hearn, Frank J. Schuh and Bob Lenhart, New Tools Allow Medium–Radius Horizontal Drilling, Technology, Jul. 14, 1986, Oil & Gas Journal, pp. 95–99.
E.P. Deliac, J.P. Messines, and B.A. Thierree, Mining Technique Finds Applications in Oil Exploration, Oil & Gas Journal, May 6, 1991, pp. 84, 86, 88, 90.
H. Delafon, BHA Prediction Software Improves Directional Drilling, Part 1, World Oil, March 1989, pp. 51–56, 60.
H. Delafon, BHA Prediction Software Improves Directional Drilling, Part 2, World Oil, Apr. 1989, pp. 45, 46, 47, 48, 50.
William P. Diamond and David C. Oyler, Drilling Long Horizontal Coalbed Methane Drainage Holes, from a Directional Surface Borehole, SPE/DOE 8968, pp. 341–346, undated.
W. Dickinson, R.G. Knoll, R. Nordlund and W. Dickinson, Flexible Sand Barrier (FSB): A Novel Sand Control System, SPE 18787, pp. 419–424, undated.
W. Dickinson, R.R. Anderson and R.W. Dickinson, The Ultrashort–Radius Radial System, SPE Drilling Engineering, Sep. 1989.
Wade Dickinson, Michael J. Pesavento, R. Wayne Dickinson, Data Acquisition, Analysis, and Control While Drilling with Horizontal Water Jet Drilling Systems, CIM/SPE 90–127, pp. 127–1 thru 127–10, undated.
Wade Dickinson, Eric Dickinson, Herman Dykstra and John M. Nees, Horizontal Radials Enhance Oil Production from a Therman Project, Oil & Gas Journal, May 4, 1992, pp. 116, 118, 120, 122, 123, 124.
Eastman, H. John, Lateral Drain Hole Drilling, Petroleum Engineer, Nov. 1954.
Eastman, H. John, Lateral Drain Hole Drilling, Petroleum Engineer, Dec. 1954.
Eastman, H. John, Lateral Drain Hole Drilling, Petroleum Engineer, Mar. 1955.
Michael J. Economides, John D. McLennan, Ernest Brown, and Jean–Claude Roegiers, Performance and Stimulation of Horizontal Wells, World Oil, Jul. 1989, pp. 69–72, 76, 77.
A. Eddison and J. Symons, Downhole Adjustable Gauge Stabilizer Improves Drilling Efficiency in Directional Wells, SPE 20454, pp. 509–516, undated.
R. Ehlers, L. Kracht and J. Witte, Case History of Horizontal Wells Drilled with Navigation Technology in European Operations, SPE/IADC 18654, pp. 315–324, undated.
Guy Feneyrou, French Three–Leg Multidrain Well Improves Production, OGJ Report, Oct. 1, 1984, Oil & Gas Journal, pp. 49–53.
Fincher, Roger W., "Short–Radius Lateral Drilling: A Completion Alternative," PE Int'l, Feb. 1987.
J.E. Fontenot, Successful High Angle Completions, Cementing, and Drilling's Impact, SPE 17628, pp. 831–842, undated.

S.H. Fowler, Jr. and C.W. Pleasants, Operation and Utilization of Hydraulic–Actuated Service Tools for Reeled Tubing; SPE 20678, pp. 631–640, undated.
Jean–Francois Glannesini, Horizontal Drilling Is Becoming Commonplace: Here's How It's Done, World Oil, Mar. 1989, pp. 35, 37, 36, 38, 40.
Lindsay Fraser, Effective Ways to Clean and Stabilize High–Angle Holes, Petroleum Engineer International, Nov. 1990, pp. 30, 32, 34, 35.
T.P. Frick and M.J. Economides, Horizontal Well Damage Characterization and Removal, SPE 21795, pp. 429–438, undated.
G–F. Fuh and P.K. Loose, Horizontal Wellbore Stability for Openhole Completions, SPE 19717, pp. 155–164, undated.
G.F. Fuh, D.B. Deom, and R.D. Turner, Wellbore Stability and Drilling Results from the First Horizontal Well in the Kotter Field Offshore The Netherlands, SPE 22544, pp. 101–109, undated.
Fuh, G., Dew, E.G., Ramsey, C.A., and Collins, K., Borehole Stability Analysis for the Design of First Horizontal Well Drilled in the UK's Southern 'V'Field, SPE 20408, Sep. 23, 1990, pp. 31–42.
J.D. Fultz, F.J. Pittard, F.D. Sawyer and W.R. Farmer, Slim–Hole Drilling in Harsh Environments, IADC/SPE 19949, pp. 333–340, undated.
Jim Fultz and Fred Pittard, Bottomhole System Works Completes Horizontal Wells, World Oil, Mar. 1990, pp. 48–50.
Andrew Gallup, B.L. Wilson and Robert Marshall, ESP's Placed in Horizontal Lateral Increase Production, Oil & Gas Journal, Jun. 18, 1990, pp. 58–60, 62–63.
D.B. Gaudin and J.C. Beasley, A Comparison of MWD and Wireline Steering Tool Guidance Systems in Horizontal Drilling, SPE 22536, pp. 7–18, undated.
A.A. Gavignet and I.J. Sobey, A Model for the Transport of Cuttings in Highly Deviated Wells, SPE 15417, undated.
T.M. Gaynor, Downhole Control of Deviation with Steerable Straight–Hole Turbodrills, SPE Drilling Engineering, Mar. 1988.
Gondouin, et al., The Challenge of West Sak Heavy Oil: Analysis of an Innovative Approach, SPE 22077, May 29, 1991, undated.
Gondouin, Heavy Oil Recovery Process, Abstract of 1$^{st}$ Qtr. Report, DOE–TI, Jan. 31, 1990.
Gondouin, Heavy Oil Recovery Process, Third Qtrly. Report, DOE–T3, Oct. 15, 1990.
Gondouin, Heavy Oil Recovery Process, 4$^{th}$ Qtrly. Report, DOE–T4, 31/91.
P.A. Goode and D.J. Wilkinson, Inflow Performance of Partially Open Horizontal Wells, SPE 19341, pp. 309–320, undated.
Anthony W. Gorody, TEDSI Develops Horizontal Drilling Technology, Oil & Gas Journal, Oct. 1, 1984, OGJ Report, pp. 118, 120, 125, 126.
Robert D. Grace, Mike Pippin, Downhole Fires During Air Drilling: Causes and Cures, World Oil, May 1989, pp. 42–44.
Stephen A. Graham, Bruce Henderson & Greg Nazzal, Drilling a Dual–Bore Horizontal Well in the Austin Chalk: A Case History, ASME 91–PET, undated.
Stephen A. Graham and Greg Nazzal, Second Lateral in Horizontal Well Solves Water, Problem Oil & Gas Journal, Mar. 18, 1991, pp. 111–114.
John F. Greenip Jr., How to Design Casing Strings for Horizontal Wells, Petroleum Engineer International, Dec. 1989; pp. 34–38.
Kenneth B. Gunn, Well Cored to 9,800 Ft. in Paraquay, Oil & Gas Journal, May 13, 1991, pp. 51–55.
Douglas Gust, Horizontal Drilling Evolving from Art to Science, Technology, Jul. 24, 1989, Oil & Gas Journal, pp. 43–46, 49–52.
R.C. Haas and C.O. Stokley, Drilling and Completing a Horizontal Well in Fractured Carbonate, World Oil, Oct. 1989, pp. 39, 40, 42, 44, 45.
D.J. Hall, J.L. Walker, E.G. Schmelzl, and T.B. Haene, Logging and Perforating of Horizontal Wells: An Innovative Approach, SPE 21836, pp. 307–316, undated.
L.R.B. Hammons, W.C. Barnett, E.K. Fisher and D.H. Sellers, Stratigraphic Control and Formation Evaluation of Horizontal Wells Using MWD; SPE 22538, pp. 25–38, undated.
Hardeman, P., Beckingham 36 Horizontal Well, SPE Drilling Engineering, Mar. 1989, pp. 17–23.
P.E. Harness, M.D. Hansen, G.A. Terzian, S.H. Fowler, Jr. and F.J. Golino, An Overview of Reeled–Tubing–Conveyed Production Logging Capabilities in California, SPE 20028, pp. 155–163, undated.
Floyd Harvey, Fluid Program Built Around Hole Cleaning, Protecting Formation, Oil & Gas Journal, Nov. 5, 1990, pp. 37–41.
Pat Herbert, Drilling with New–Generation Positive Displacement Motors, SPE 10239, undated.
Hesse, Karl, Multilateral Drilling—A Case History, Customer Presentation?, Nov. 25, 1992.
D.R. Holbert, New Interest in Drainhole Drilling Revives Technology, World Oil, Mar. 1981, pp. 57, 58, 61, 62, 64, 66, 70, 72.
Holifield & Associates, Pearsall and Giddings Austin Chalk Horizontal/Directional Drilling Program, Quote to Customer?, Jun. 1, 1991.
Ray H. Holifield, Bill Rehm, Recompletion by Horizontal Drilling Pays Off, World Oil, Mar. 1989, pp. 42, 43, 50.
Holton, David S., How Shell Handles Remedial Jobs at Ventura, Petroleum Engineer, Jan. 1963.
J.L. Hood III, M.D. Mueller, and M.G. Mims, The Uses of Buoyancy in Completing High–Drag Horizontal Wellbores, SPE 23027, pp. 757–764, undated.
M.R. Islam and A.E. George, Sand Control in Horizontal Wells in Heavy Oil Reservoirs, SPE 18789, pp. 437–452, undated.
Warren Jones, Unusual Stresses Require Attention to Bit Selection, Oil & Gas Journal, Oct. 22, 1990, pp. 81–85.
Joshi, S.D., Proper Completion Critical for Horizontal Wells, Special Report, Johsi Technologies International, Inc., Jan. 1990.
Joshi, S.D., "A Review of Horizontal Well and Drainhole Technology" SPE paper 16868, presented at the 62$^{nd}$ Annual Technical Conference and Exhibition of the Society of Petroleum Engineers, Dallas, TX, Sep. 27–30, 1987.
Jurgens, R., Bitto, R., Henderson, B., White, C., and Mullins, G., Horizontal Drilling and Completions: A Review of Available Technology, Petroleum Engineer International, Feb. 1991, pp. 14–21.
Rainer Jurgens, Ron Bitto, Bruce Henderson, Cameron White and Gus Mullins, Horizontal Drilling and Completions: A Review of Available Technology, Petroleum Engineer International, Mar. 1991, pp. 32–34, 36–37.

H. Karisson, R. Cobbley, and G.E. Jaques, New Developments in Short, Medium, and Long–Radius Lateral Drilling, SPE/IADC 18706, pp. 725–736, undated.
Haraldur Karisson and Ron Bitto, Worldwide Experience Shows Horizontal Well Success, World Oil, Mar. 1989, pp. 51–54, 56.
L. Keelean, S.S. Harris and N. Petronio, Short Radius Drilling Technology Utilizing Mobile Service/Workover Rig, SPE/IADC 18711, pp. 765–772, undated.
D. Kerr and K. Lesley, Mechanical Aspects of Medium Radius Well Design, SPE 17618, pp. 719–726.
Denny Kerr, Designing Tangent Sections for Medium–Radius Horizontal Wells, World Oil, Mar. 1991, pp. 45–47.
Denny Kerr, How to Drill a Smooth Medium–Radius Well, World Oil, Mar. 1990, pp. 46–47.
G.E. King, Perforating the Horizontal Well, Journal of Petroleum Technology, Jul. 1989, pp. 671–672.
William King, Selecting Bits for Extended Reach and Horizontal Wells, World Oil, Apr. 1990, pp. 55–57, 59–60.
Kuich, Seismic and Horizontal Drilling Unlock Austin Chalk, World Oil, Sep. 1990, pp. 47, 48, 50, 52, 54.
M.J. Landman and W.H. Goldthorpe, Optimization of Perforation Distribution for Horizontal Wells, SPE 23005, pp. 567–576, undated.
William J. Lang and Marion B. Jett, High Expectations for Horizontal Drilling Becoming Reality, Oil & Gas Journal, Sep. 24, 1990, OGJ Special, pp. 70, 74, 76, 79.
R.C. Leaf and F.J. Pittard, Review of Horizontal Methods and Drilling Technology, SPE 21862, pp. 575–584, undated.
J. Lessi and A. Spreux, Completion of Horizontal Drainholes, SPE 17572, pp. 209–218, undated.
T.K. Li, V. Chandelle, and J. Brych, Lateral Drilling: A New Application Shows Promise, World Oil, Jun. 1986, pp. 68–71.
Jeff H. Littleton, Sohio Studies Extended–Reach Drilling for Prudhoe Bay, Petroleum Engineer International, Oct. 1985, pp. 28, 32, 34.
D. Malekzadeh and D. Tiab, Interference Testing of Horizontal Wells, SPE 22733, pp. 717–727, undated.
Christian Mariotti and Evelyne Kou, Elf Improves Horizontal Drilling at Rospo Mare, Petroleum Engineer International, Aug. 1988, pp. 30, 32, 35.
C.M. Matthews and L.J. Dunn, Drilling and Production Practices to Mitigate Sucker Rod/Tubing Wear–Related Failures in Directional Wells, SPE 22852, pp. 363–374, undated.
Ron Matson and Rod Bennett, Cementing Horizontal Holes Becoming More Common, Oil & Gas Journal, Dec. 17, 1990, pp. 40–46.
Maurer Engineering, Inc., "Evaluation of Branch and Horizontal Boreholes for in Situ Leach Mining," U.S. Dept. of the Interior, Bureau of Mines Paper (Maurer), Jul. 1980.
G.K. McKown, Drillstring Design Optimization for High–Angle Wells, SPE/IADC 18650, pp. 275–282, undated.
J. Misselbrook, G. Wilde and K. Falk, The Development and Use of a Coiled–Tubing Simulation for Horizontal Applications, SPE 22822, pp. 29–41, undated.
T.J. Moo and M.W. Tweedy, Planning and Drilling Australia's First Medium–Radius Horizontal Wells, SPE 23013, pp. 629–640, undated.
Steven D. Moore, Meridian Oil Finds Success with Horizontal Wells; Petroleum Engineer International, Nov. 1989, pp. 17, 18, 19, 20, 22.
W.D. Moore III, ARCO Drills Horizontal Drainhole for Better Reservoir Placement, Oil & Gas Journal, Sep. 15, 1980, pp. 139–148.
Guntis Moritis, Horizontal Drilling Scores More Successes, Oil & Gas Journal, OGJ Special, Feb. 26, 1990, pp. 53, 54, 58, 62, 63, 64.
Guntis Moritis, Horizontal Drilling Technology Keeps Advancing, Oil & Gas Journal, OGJ Special, Mar. 11, 1991, pp. 49–53.
Muriby, et al., Horizontal Drilling Success Offshore ABU Dhabi, SPE 21311, Nov. 16, 1991.
F.R. Myal and K–H. Frohne, Slant–Hole Completion Test in the Piceance Basin, Colorado, SPE 21866, pp. 611–622, undated.
S.B. Nice and W.H. Fertl, Logging, Competing Extended–Reach and Horizontal Wells, World Oil, Mar. 1991, pp. 49, 50, 52, 53, 55, 56.
Sid B. Nice, Leading Edge Logging, Well Logging and Completion Technology for Horizontal Wellbores, Popular Horizontal, p. 4, undated.
Sid B. Nice and W.H. Fertl, New Logging, Completion Techniques Boost Horizontal Well Productivity, Petroleum Engineer International, Nov. 1990, pp. 20, 22, 23, 26.
G. Norel, C. Bubois, and G. Georges, Test Bench Checks Cement in Horizontal Holes, Petroleum Engineer International, Nov. 1988, pp. 54–59.
Parcevaux, Philippe, Guides Emerge for Cementing Horizontal Strings, OGJ, Oct. 19, 1987.
Parsons, et al., "Short–Radius Lateral Drilling: A Completion Alternative," Society of Petroleum Engineers (SPE), Paper #15943, Nov. 12, 1986, Richardson, Texas.
Larry E. Pendleton and A. Behrooz Ramesh, Bechtel Develops Innovative Method for Horizontal Drilling, Technology, May 27, 1985, Oil & Gas Journal, pp. 95–99.
C.J. Perry, Directional Drilling with PDC Bits in the Gulf of Thailand, SPE 15616, undated.
Dr. A.S. Pocovi and Lic. L. Gustavino, Dr. A. Pozzo and Eng. J.A. Musmarra, Comparing Cost and Performance of Horizontal Wells, World Oil, Mar. 1991, pp. 39, 40, 42–44.
Pope, C.D., and Handren, P.J., Completion Techniques for Horizontal Wells in the Pearsall Austin Chalk, SPE 20682, Sep. 23, 1990, pp. 657–664.
Michael M. Power, Roger Chapman, and Robert O'Neal, Horizontal Well Sets Depth Record Completing Deep Horizontal Well, Petroleum Engineer International, Nov. 1990, pp. 37–38.
Michael M. Power, Roger Chapman, and Robert O'Neal, Horizontal Drilling Below 14,600 Ft; Petroleum Engineer International, Nov. 1990, p. 36.
Prevedel, B., "New Techniques in Horizontal and Drainhole Drilling Optimization: Lehrte 41 Lateral Drilling Project," SPE 15694, Mar. 7, 1987.
Bernhard Prevedel, Case History: How One Operator Drilled Horizontally Through a Salt Dome, World Oil, Dec. 1985, pp. 69, 73, 76, 80.
R.H. Reiley, J.W. Black, T.O. Stagg, D.A. Walters and G.R. Atol, Cementing of Liners in Horizontal and High–Angle Wells at Prudhoe Bay, Alaska, SPE 16682, pp. 583–590, undated.
R.H. Reiley, J.W. Black, T.O. Stagg, D.A. Walters and G.R. Atol, Improving Liner Cementing in High–Angle/Horizontal Wells, World Oil, Jul. 1988, pp. 69, 71, 73, 74.
O. Rivas, A Newsky, M. Cedeno, P. Rivera, Sucker Rod Centralizers for Directional Wells, SPE 21131, undated.

O.L.A. Santos, Important Aspects of Well Control for Horizontal Drilling Including Deepwater Situations, SPE/IADC 21993, pp. 785–796, undated.

S. Schellenberg, T. Rogers and L. Smith, Deviation Control with Steerable System Lowers Well Costs in Southern Oklahoma, SPE 22567, pp. 299–312, undated.

L. McDonald Schetky, Shape–Memory Alloys, Nov. 1979, vol. 241, No. 5, pp. 2–10.

D.R. Schroeter and H.W. Chan, Successful Application of Drilling Technology Extends Directional Capability, SPE Drilling Engineering, Sep. 1989, pp. 230–236.

Siegfried K. Schueler, Horizontal Well Improves Recovery in Deep Sour Gas Field, Oil & Gas Journal, Mar. 23, 1992, pp. 93, 94, 96, 97.

L. Shale, Development of Air Drilling Motor Holds Promise for Specialized Directional Drilling Applications, SPE 22564, pp. 275–286, undated.

Les Shale, Downhole Motor Specifically Designed for Directional Air Drilling, Oil and Gas Journal, Feb. 3, 1992, pp. 45–49.

D.W. Sherrard, B.W. Brice and D. G. MacDonald, Application of Horizontal Wells at Prudhoe Bay, SPE 15376, pp. 1–8, tables 1–15, undated.

Correspondence, from William E. Shull to Matt W. Carson, Oct. 2, 1996.

R.A. Skopec, M.M. Mann, D. Jeffers and S.P. Grier, Horizontal Core Acquisition and Orientation for Formation Evaluation, SPE 20418, pp. 153–166, undated.

M.Y. Soliman, James L. Hunt and A.M. El Rabaa, Fracturing Aspects of Horizontal Wells, Aug. 1990, JPT.

Mohamed Soliman, Bob Rose, Wadood El Rabaa and James L. Hunt, Planning Hydraulically Fractured Horizontal Completions, World Oil, Sep. 1989, pp. 54–56, 58.

Derry D. Sparlin and Raymond W. Hagen, Jr., Controlling Sand in a Horizontal Completion, World Oil, Nov. 1988, pp. 54–58.

A. Spreux, A. Louis, M. Rocca, Logging Horizontal Wells—Field Practice for Various Techniques, SPE 16565, pp. 1–14, undated.

Alain Spreux, Christian Georges, and Jacques Lessi, Most Problems in Horizontal Completions Are Resolved, Technology, Oil & Gas Journal, Jun. 13, 1988, pp. 48–52.

Stagg and Reiley, Horizontal Well Completions in Alaska, World Oil, Mar. 1990, pp. 37–44, undated.

Carl W. Stang, Alternative Electronic Logging Technique Locates Fractures in Austin Chalk Horizontal Well, Oil & Gas Journal, Nov. 6, 1989, Technology, pp. 42–45.

Steenbock, et al., "Alternative Drainhole Drilling System—Theoretical Background and Practical Experience", undated.

Stormont, D.H., "Increasing Drainage of Oil into Well by Drain–Hole Drilling," Oil and Gas Journal, Aug. 17, 1953.

R.J. Tailby, J.H. Yonker and J.L. Pearce, A New Technique for Servicing Horizontal Wells, SPE 22823, pp. 43–58, undated.

Todd Talbot, Dual Horizontal Well Completion, Baker Oil Tools, Dec. 8, 1992.

Talk et al., Special Liner Design Improves Dual Lateral Horizontal Well, OGJ, Aug. 31, 1992.

Glen Tolle, Thomas Dellinger, Mobil Identifies Extended–Reach Drilling Advantages, Possibilities in North Sea, Oil & Gas Journal, May 26, 1986, Technology, pp. 78, 81–86.

D.K. Trichel and M.P. Ohanlan, Unique Articulated Downhole Motor Holds Promising Future for Short Radius Horizontal Drilling, SPE 20417, pp. 137–149, undated.

Y. Tsukano and M. Ueno, Development of Lightweight Steel Drillpipe with 165–ksi Yield Strength, IADC/SPE 19960, pp. 403–412, undated.

H.J. Vrielink and A.M. Hippman, Optimization of Slant Well Drilling in the Lindberg Field, SPE Drilling Engineering, Dec. 1989, pp. 307–314.

M.B. Webster, G.E. Otott Jr. and D.L. Rice, Cementing High–Angle–Wells Using Cement–Expanded Formation Packers and/or Casing Rotation, SPE/IADC 16136, pp. 745–754, undated.

J.B. Weirich, T.E. Zaleski Jr., and P.M. Mulcahy, Perforating the Horizontal Well: Designs and Techniques Prove Successful, SPE 16929, pp. 503–508, undated.

C.W. White, Drilling and Completion of a Horizontal Lower Spraberry Well Including Multiple Hydraulic Fracture Treatments, SPE 19721, pp. 205–210, undated.

Cameron White and Mark Hopmann, Controlling Flow in Horizontal Wells, World Oil, Nov. 1991.

Cameron White, Formation Characteristics Dictate Completion Design, Oil & Gas Journal, Dec. 3, 1990, pp. 58–62, 64.

J.P. Wilkerson, J.H. Smith, T.P. Stagg and D.A. Walters, Horizontal Drilling Techniques at Prudhoe Bay, Alaska, SPE 15372, undated.

M.A. Wilson and F.L. Sabins, A Laboratory Investigation of Cementing Horizontal Wells, SPE Drilling Engineering, Sep. 1988, pp. 275–280.

R.C. Wilson and D.N. Willis, Successful High Angle Drilling in the Stafjord Field, SPE 15465, pp. 1–13, undated.

Bruce Woodlan and G.E. Powell, Casing Design in Directionally Drilled Wells, SPE 5352, pp. 1–12.

Jiang Wu, Ping Chen and Hans C. Juvkam–Wold, Casing Centralization—Centralization of Casing in Horizontal Wells, Popular Horizontal, Apr./Jun. 1991, pp. 14–21.

Jiang Wu, Hans C. Juvkam–Wold, Drag and for Horizontal Wells Simplified for Field Use, Oil & Gas Journal, Apr. 29, 1991, pp. 49–53, 56.

T.E. Zaleski, Jr., Sand–Control Alternatives for Horizontal Wells, JPT, May 1991.

Theodore E. Zaleski, Jr. and Jefferson P. Ashton, Gravel Packing Feasible in Horizontal Well Completions, Oil & Gas Journal, Jun. 11, 1990, pp. 33–37.

Chris Zimmerman and Donny Winslow, How to Select the Right Tools for Stimulating Horizontal Wells, World Oil, Nov. 1989, pp. 53–36.

C. Zurdo, C. Georges, and M. Martin, Mud and Cement for Horizontal Wells, SP 15464, undated.

Cementing of Horizontal Wells, Horizontal Well Completions, pp. 9–14, undated.

Drilling Fluids for Horizontal Wells, Oilfield Review, vol. 2, No. 3, pp. 8–10, undated.

Fracturing of Horizontal Wells, Horizontal Well Completions, Western International, pp. 23–30, undated.

Staff Report, Getting to the Bottom with Slant–Hole Logging Tools, Petroleum Engineer International, Feb. 1988, pp. 32, 34.

Horizontal Drilling Records Recognized, Petroleum Engineer International, Feb. 1988, p. 35.

Horizontal Drilling Stays Hot; Petroleum Engineer International, Apr. 1989, Petroleum Engineer International, p. 24.

Schlumberger, Horizontal Wells—Reach Out for Reservoir Data to Maximize Productivity from Your Horizontal Well; Petroleum Engineer International, Nov. 1990, pp. 40–41.
Horizontal Well Case Histories, Horizontal Well Completions, Western International, pp. 31–37, undated.
New Logging Techniques, Petroleum Engineer International, Nov. 1990, pp. 27–29.
Matrix Stimulaton of Horizontal Wells, Western International, pp. 15–21, undated.
Reservoir Selection for Horizontal Wells, Western International, pp. 1–8, undated.
SPE 20005, JPT, Apr. 1990, pp. 399–400.
S. Barus "Computation of Heat Transfer in Wellbores with Single and Dual Completions," SPE paper 22868 presented at the 66$^{th}$ Annual Technical Conference and Exhibition of the Society of Petroleum Engineers, Dallas, TX, Oct. 6–9, 1991.
Butler, R.M., "A New Approach to the Modeling of Steam–Assisted Gravity Drainage," J.Cdn.Pet.Tech., May–Jun. 1985, pp. 417–421.
Cooper, et al., "Deep Heavy–Oil Recovery by Steam Injection Using Twin Horizontal Drainholes," Society of Petroleum Engineers 24088, Mar. 30–Apr. 1, 1992.
*Natural Reserves Group, Inc.* v. *Baker Hughes, Inc. et al.* (District Court Harris County, Texas 333$^{rd}$ Judicial District) No. 96–31380—Pleadings and documents, undated.
Exhibit A: Plaintiff's Original Petition, Jun. 21, 1996.
Exhibit B: Defendants' Original Answer, Jul. 29, 1996.
Exhibit C: Agreed Protective Order (signed by Judge), Oct. 11, 1996.
Exhibit D: Scheduling Order, Oct. 17, 1996.
Exhibit E: Defendants' Original Counterclaim, Apr. 23, 1997.
Exhibit F: Plaintiff's First Amended Original Petition, Sep. 4, 1997.
Exhibit G: Defendants' Motion for Leave to File Defendants' Amended Motion for Summary Judgment on All Claims in Plaintiff's First Amended Original Petition, Sep. 12, 1997.
Exhibit H: Defendants' Amended Motion for Summary Judgment on All Claims in Plaintiff's First Amended Original Petition, Sep. 12, 1997.
Exhibit I: Plaintiff's Second Amended Original Petition, Sep. 25, 1997.
Exhibit J: Plaintiff's Response to Defendants' Amended Motion for Summary Judgment on All Claims in Plaintiffs First Amended Original Petition, Oct. 30, 1997.
Exhibit K: Stipulation Between NRG and Halliburton Regarding Exchange of "Confidential" and "Highly Confidential" Information, undated.
Exhibit L: Defendants' Reply Memorandum in Support of Motion for Summary Judgment on All Claims Based on Defendants' Independent Development of Information Contained in Baker Hughes' Patents, Dec. 3, 1997.
Exhibit M: Plaintiff's Third Amended Original Petition, Mar. 3, 1998.
Exhibit N: Supplemental Agreed Protective Order Between Baker Hughes Incorporated et al., Halliburton Energy Services, Inc., Halliburton Company and Sperry–Sun Drilling Services, Inc., Mar. 30, 1998.
Exhibit O: *Natural Reserves Group, Inc.* v. *Baker Hughes, Inc.* Docket Sheet, Jul. 24, 1998.

* cited by examiner (CANCELED)

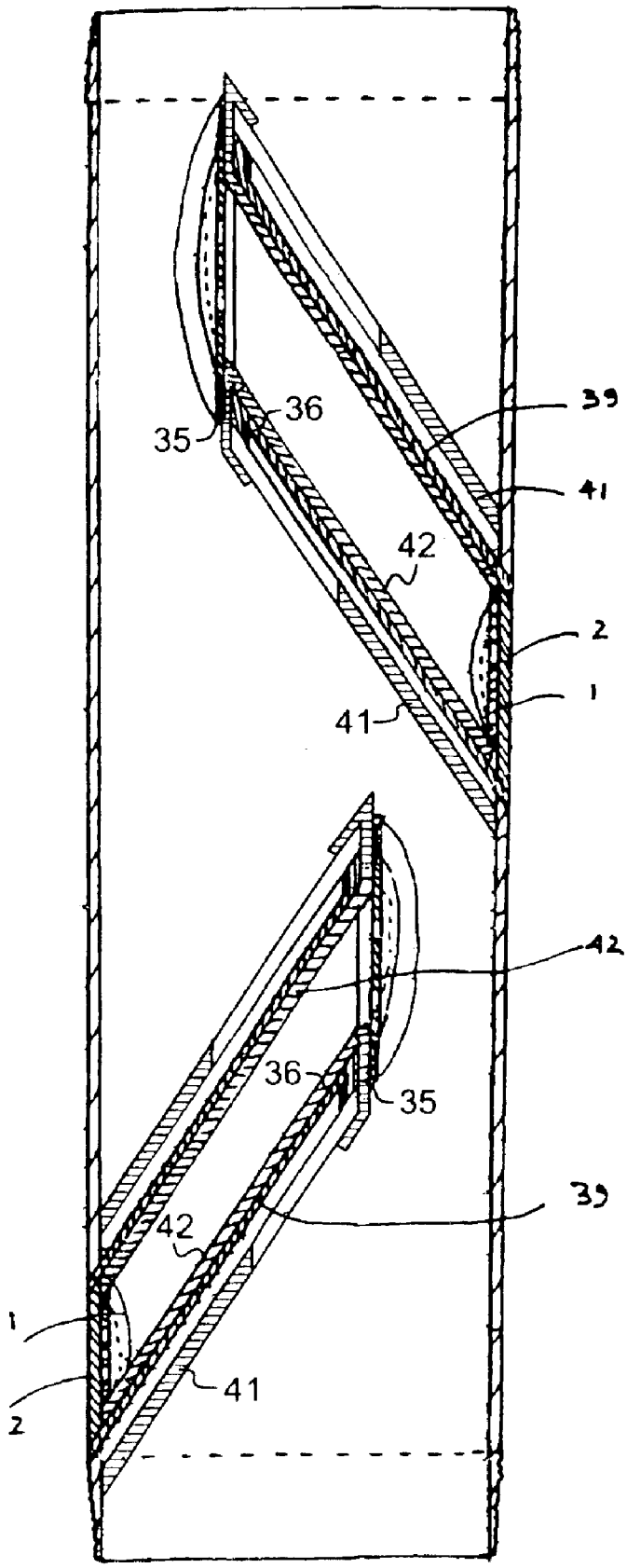
FIG. 4
AMENDED (CANCELED)

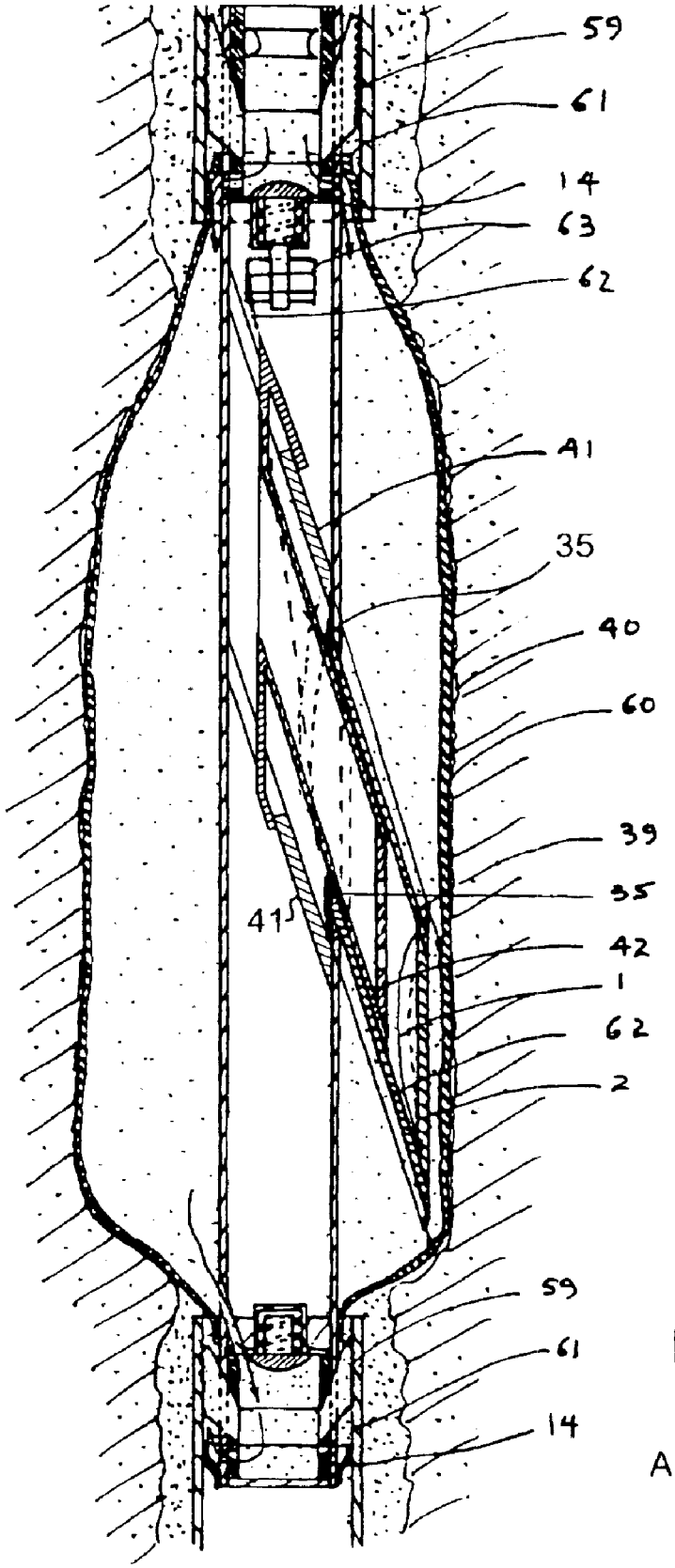
FIG. 10
AMENDED

DOWNHOLE EQUIPMENT TOOLS AND ASSEMBLY PROCEDURES FOR THE DRILLING, TIE-IN AND COMPLETION OF VERTICAL CASED OIL WELLS CONNECTED TO LINER-EQUIPPED MULTIPLE DRAINHOLES

Matter enclosed in heavy brackets [ ] appears in the original patent but forms no part of this reissue specification; matter printed in italics indicates the additions made by reissue.

*This reissue application is a continuation of reissue application no. 09/956,806, filed on Sep. 21, 2001, which issued as U.S. Pat. No. RE39,141, on Jun. 27, 2006. Reissue application no. 11/039,454, filed on Jan. 21, 2005, which is now abandoned, is also a continuation of RE39,141. Reissue application 09/956,806 is a continuation of reissue application no. 08/861,457 filed on May 22, 1997, which issued as U.S. Pat. No. RE37,867, on Oct. 8, 2002. Reissue application no. 09/824,738, filed on Apr. 4, 2001, which issued as U.S. Pat. No. RE38,636, on Oct. 26, 2004, is also a continuation of U.S. Pat. No. RE37,867. Reissue application no. 09/871,813, filed on Jun. 4, 2001, which issued as U.S. Pat. No. RE38,642, on Nov. 2, 2004, is also a continuation of U.S. Pat. No. RE37,867. Reissue application no. 09/944,115, filed on Sep. 4, 2001, which issued as U.S. Pat. No. RE37,616, on Oct. 12, 2004, is also a continuation of U.S. Pat. No. RE37,867.*

FIELD OF THE INVENTION

Horizontal wells have been used extensively in heterogeneous reservoirs to intersect fractures and/or to reduce the detrimental effects of gas coning and water coning. It has been shown that such wells are capable of higher oil production rates than vertical wells drilled in the same reservoir. In most cases, the higher productivity more than offsets the higher cost of drilling and completion of the horizontal wells. Theory predicts that the use of multiple horizontal drainholes correspondingly multiplies the total well productivity. Indeed many vertical cased wells connected to twin or multiple horizontal drainholes of medium (500-200 ft) and about (150-40 ft) radius of curvature have been successfully used in compact oil reservoirs, such as the Austin Chalk, in which open hole completion of the drainholes is applicable.

In many clastic reservoirs, however, the strength of unconsolidated sands or of friable sandstones may be insufficient to keep horizontal drainholes open. In such a case, the horizontal and deviated parts of each drainhole must be kept open with a tubular liner which is tied to the vertical casing using conventional equipment and known assembly procedures. This has been done in many different clastic reservoirs, containing light or heavy oil, for horizontal wells consisting of a single liner-equipped drainhole.

A patented U.S. Pat. No. 4,787,465 drilling and completion technique for multiple drainholes of ultra-short (ca. 10 ft) radius of curvature has also been used in such sandy reservoirs, but the liners of the short multiple drainholes are not tied-in to the vertical casing and their inner diameter and curvature radius are too small to allow the use of conventional logging and cleaning tools.

SUMMARY OF THE INVENTION

The present invention addresses the problem of drilling, cementation and tie-in by pressure-tight connections to a casing of twin or multiple drainholes of medium to short radius of curvature (typically 500 ft to 40 ft) equipped with liners of sufficient diameter to allow the passage of available well logging, perforating, cementing and cleaning tools, for subsequent well maintenance and repairs.

The next step is to provide the means to bring up the reservoir fluids and/or to inject fluids from the surface into the reservoir through the drainhole liners. Depending upon the mode of exploitation of the well and field conditions, a great variety of tubing completion assemblies may be used for these purposes. The simplest, which allows only commingled flow from or into all drainholes simultaneously, does not even requires any additional equipment if vertical flow is through the casing, but it provides minimum operational flexibility and no safety controls. For these reasons, additional equipment (at least a properly sized production tubing or a kill string for safety, for instance, and often a hanger or a packer) will be used in the field. The tubing completion assembly which provides the greatest operational flexibility and safety is that which provides a direct connection of each drainhole separately to a tubing, thus leaving the casing/tubing annulus available for other uses. This is the type of tubing completion assembly which is included in the present invention. It also provides the means of implementing in this type of heterogeneous reservoirs the heavy oil recovery process and the injected steam quality conservation process described respectively in U.S. Pat. No. 4,706,751 and U.S. Pat. No. 5,085,275 using some of the equipment described in U.S. Pat. No. 5,052,482. The present invention, however, does not preclude the use of the already known simpler completion designs, whenever they are sufficient for the application considered. Known elements of downhole equipment (valve nipple joints, safety joints, retrievable plugs, etc. . . ) may also be added, as needed, to the novel tubing completion assembly to perform specific additional tasks.

Some of the reservoirs under consideration, especially those containing heavy oil, require artificial lift to bring the production stream to the surface. The present invention includes equipment providing the means of pumping produced fluids and of injecting steam and/or other gases in such wells equipped with multiple drainholes completed with liners. Sand production being frequent in such reservoirs, the drainholes may be gravel packed or equipped with screens or subjected to known sand consolidation techniques.

The desired well and drainholes configuration may be obtained either with entirely new wells or by re-entry into an existing vertical cased well, in which case the required equipment and procedures are somewhat different.

In all cases it is intended to obtain leak-proof connections between the drainhole liners and the vertical casing and between the drainhole liners and the tubing used either for production, injection and pumping. The desirability of a system which can be installed in as few steps as possible and which can easily be disassembled during future work-over operations has led to develop downhole equipment and procedures, which conform with proven oil field safety practices.

Due to the complex nature of oil reservoirs, especially those made-up of clastic rocks deposited in agitated water (Fluvio-Deltaic environment, turbidite currents or near shore sedimentation) or those resulting from eolien transport (Dunes), The presence of various sediment heterogeneities and fractures, together with other reservoir engineering considerations regarding water/oil and gas/oil contacts locations, reservoir fluid pressure and solution GOR of the produced oil, will dictate various well and drainhole configurations.

Although the most frequently applicable is that of twin drainholes with their respective horizontal sections oriented at 180 degrees from each other, the equipment, tools and procedures which will be described are not restricted to that single configuration. It will become apparat to those skilled in the art that similar equipment and procedures may be adapted to all other multiple drainhole configurations without departing from the spirit of this invention.

Ranked in increasing degrees of complexity, the cases of drilling, tie-in and completion of new wells include:

1) side by side drainholes kicked-off from the bottom of a vertical cased well, using a twin whipstock, 2) side by side drainholes connected by intermediate liners to the bottom of a vertical well, 3) side by side drainholes obtained from a deviated cased well, 4) stacked drainholes kicked-off one above the other from a new vertical cased well. Two different tie-in methods and equipment types will be described, one using telescopic liner stubs and telescopic connector tubes to tie-in and complete the well, the other using intermediate cemented liners and articulated connector tubes.

5) use of a single pump for both drainholes, located above the kick-off points, 6) conveyance of low GOR production streams from each drainhole through a syphon to a single pump located near the base of an oil sump well below the kick-off points, 7) pumping of each drainhole with a pump located at or near the start of the horizontal segment, 8) simultaneous injection of steam and/or gases into one drainhole while producing oil and water from the other drainhole, as taught in in U.S. Pat. Nos. 4,706,751 and in application No. 512,317, now U.S. Pat. No. 5,085,275.

For re-entry into an existing vertical cased well, modified equipment and procedures will be described, corresponding to cases similar to cases 1, 2, 4, 6, 7 and 8 above.

BRIEF DESCRIPTION OF DRAWINGS

FIG. 1[l]d is a vertical cross section of an overshot-type tool used in case 1.

FIG. 4 is a vertical cross section showing the special casing joint with its stub extended and cemented in the reamed cavity of Case 4.

FIG. 10 is a vertical cross section of the special casing patch with telescopic stubs used in Case 4a.

DETAILED DESCRIPTION OF THE INVENTION

CASE 1 (TWIN WHIPSTOCK)

Figure 1:
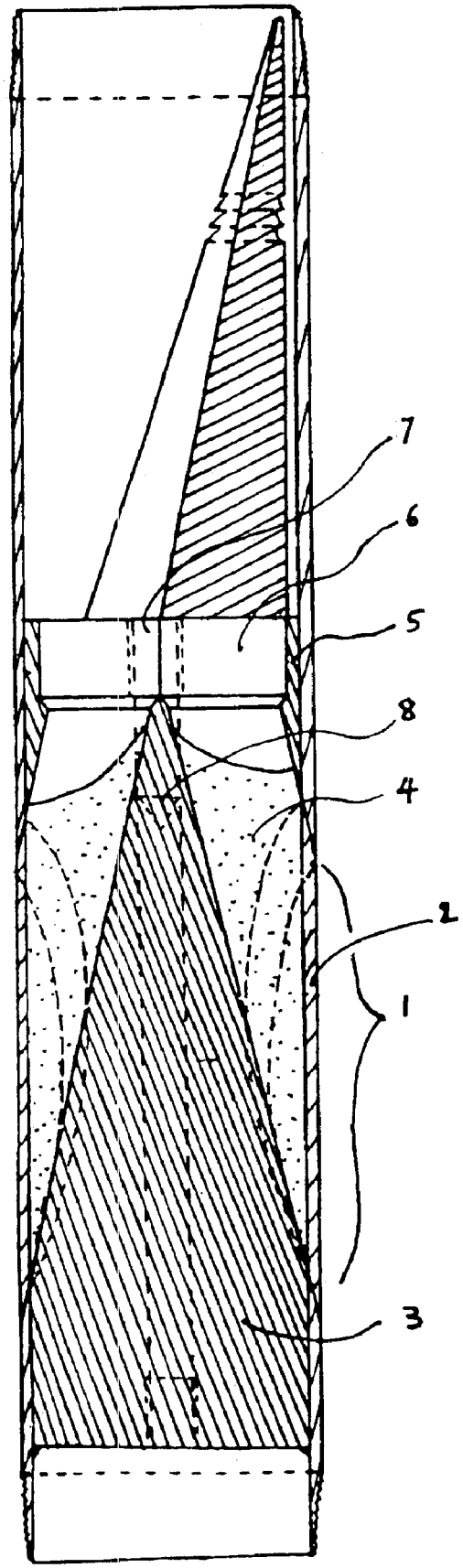
FIG. 1 is a vertical cross section of the special casing joint with twin whipstocks used in Case 1.

In Case 1 a vertical well is drilled to a depth slightly greater than that of the common kick-off depth of the drainholes. The casing string is made-up by including a special joint immediately above the conventional casing shoe and float collar. This casing joint shown on FIG. 1 includes two elliptical windows (1) machined at the desired kick-off angle typically about 2 degrees oriented downward from the vertical.

Figure 1A:
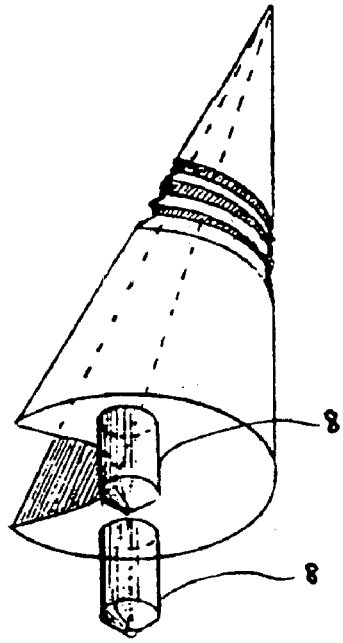
FIG. 1a is a perspective drawing showing the base of the retrievable top whipstock of Case 1.

These windows are plugged up with a drillable material (an Aluminum plate (2), for instance) machined to conform with the cylindrical surfaces of the casing. A twin whipstock (3), of hardened metal, is securely fastened to the casing joint, for instance by welding. It provides a curved guiding path from a guide plate above to each of the two plugged windows. For added strength, a portion of that curved guide may be partly filled with cement (4) or other drillable material. The guide plate (5), on top of the whipstock, presents four vertical cylindrical holes, two of them (6) of a diameter larger than that of the drainholes and two of them smaller. One of the smaller holes (7) in the guide plate (5) is threaded and extends to the whipstock base, to provide a flow path to the float collar and shoe below it. During cementing operations, the work string will be stabbed into the threaded connection to inject the cement slurry into the float collar and shoe and from there into the annular space behind the casing. The other small cylindrical hole has a smooth bore. Its function is to receive one of the alignment pins (8) used to positions and latch a retrievable whipstock top which provides a continuation of the guiding path from one of the two large holes to the casing side. The combination of the permanent twin whipstock with its retrievable top provides a guide to the drainhole drilling bit through the machined window. A perspective view of the retrievable top whipstock showing its two alignment pins (8) is presented on FIG. 1a.

Figure 1B:
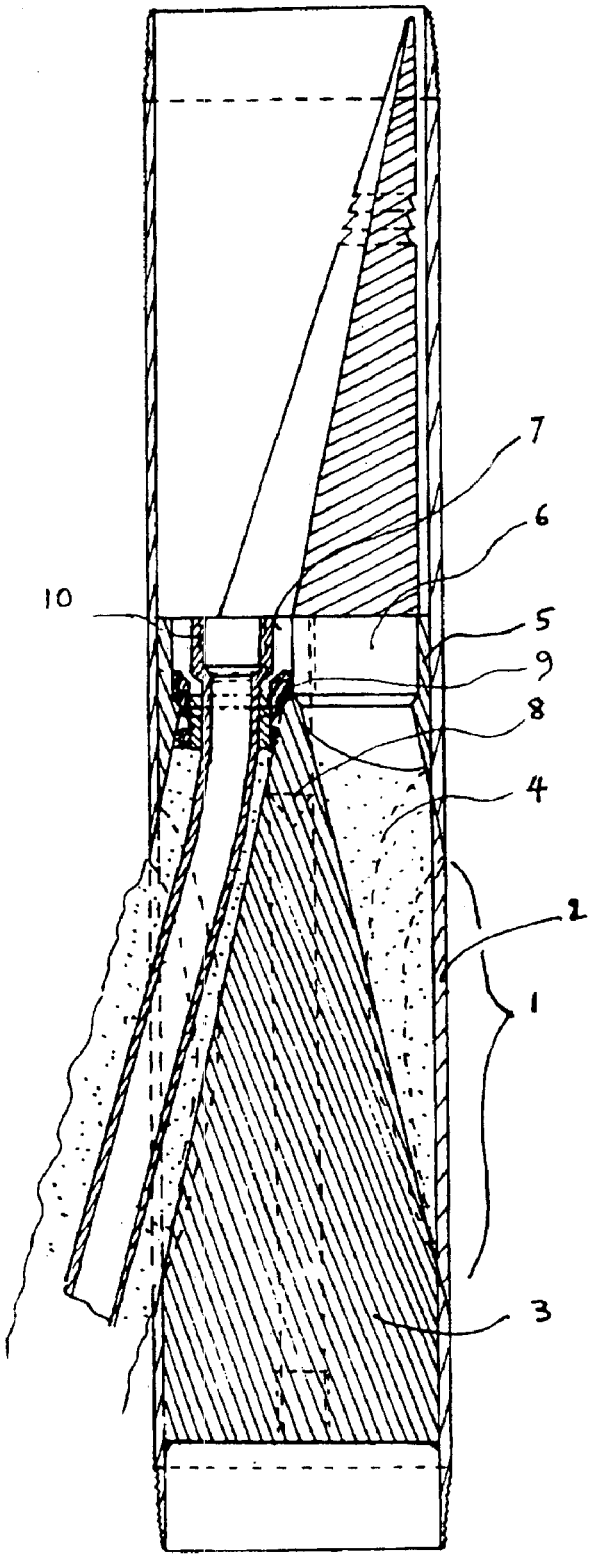
FIG. 1b is a vertical cross section showing the drainhole tie-in to the casing.

When the first drainhole has been drilled to its total measured depth, the same whipstock (top and bottom parts) guides the liner into the drainhole. The liner, in the horizontal part, may be a slotted liner equipped with screens for gravel packing or it may be cemented and later selectively perforated. In all cases, however, the curved part of the liner is cemented using known procedures. The tail end of the liner is cemented and hung into the open large vertical hole in the bottom whipstock (FIG. 1b), by means of a known hydraulically-set hanger (9) equipped with dual sets of slips and pressure-setting seals. It is terminated by the female part of a polished bore receptacle (10), which connects the liner to the work string used to run-in and cement the liner. When the cement has set, the work string is disconnected, a recess in the top whipstock is latched into hooks in an overshot tool, pulled up and rotated by 180 degrees for presentation and insertion of the two alignment pins (or prongs) respectively into each alternate small hole in the permanent whipstock. The overshot tool is then released and pulled out.

Drilling of the cement and plug in the second window now begins the drilling and liner cementing operations for the second drainhole, using the same procedures. With the liner hung and sealed in the second large vertical hole in the permanent whipstock, the work string is disconnected from the second polished bore receptacle. The top whipstock is latched with an overshot tool and pulled out of the well. This completes the drainholes drilling and tie-in operations.

Figure 1C:
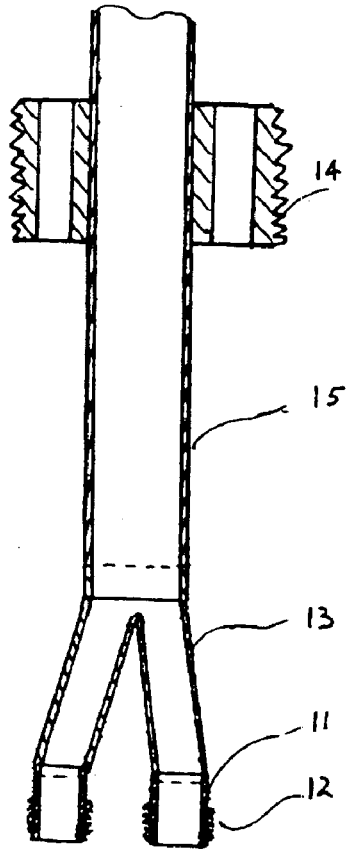
FIG. 1c is a vertical cross section showing the tubing completion.
Figure 1D:
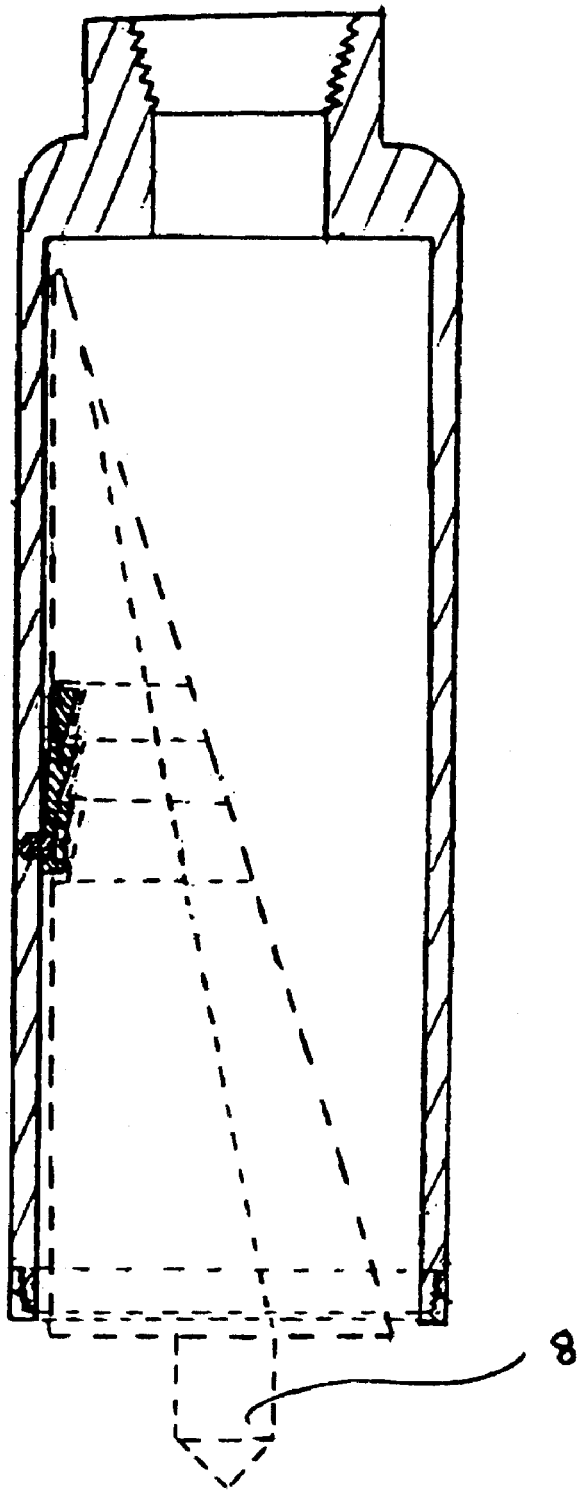

Completion of the well (see FIG. 1c) is achieved by making up and running-in a tubing spring consisting of dual tubing prongs (11) equipped with chevron seals (12) and connected to the lower ends of an inverted Y nipple joint (13). The chevron seals constitute the male mating parts of the two polished bore receptacles (10) previously installed. The upper branch of the inverted Y nipple joint (13) is connected to a conventional tubing hanger (14) which may be set hydraulically or by wireline. The tubing string (15) is oriented so as to stab the tubing prongs into the female parts of the two polished bore receptacles. After leak-testing of the sealed connections, the tubing hanger is set and the wellhead is nippled up using conventional equipment and procedures.

If the well is not naturally flowing, artificial lift equipment may also be included in the tubing string, such as gas lift valves, diverter valves, a pump seat nipple, etc. . . in the manner which is familiar to those skilled in the art of oil well completion.

CASE 2 (TWIN DEVIATED HOLES)

Figure 2:
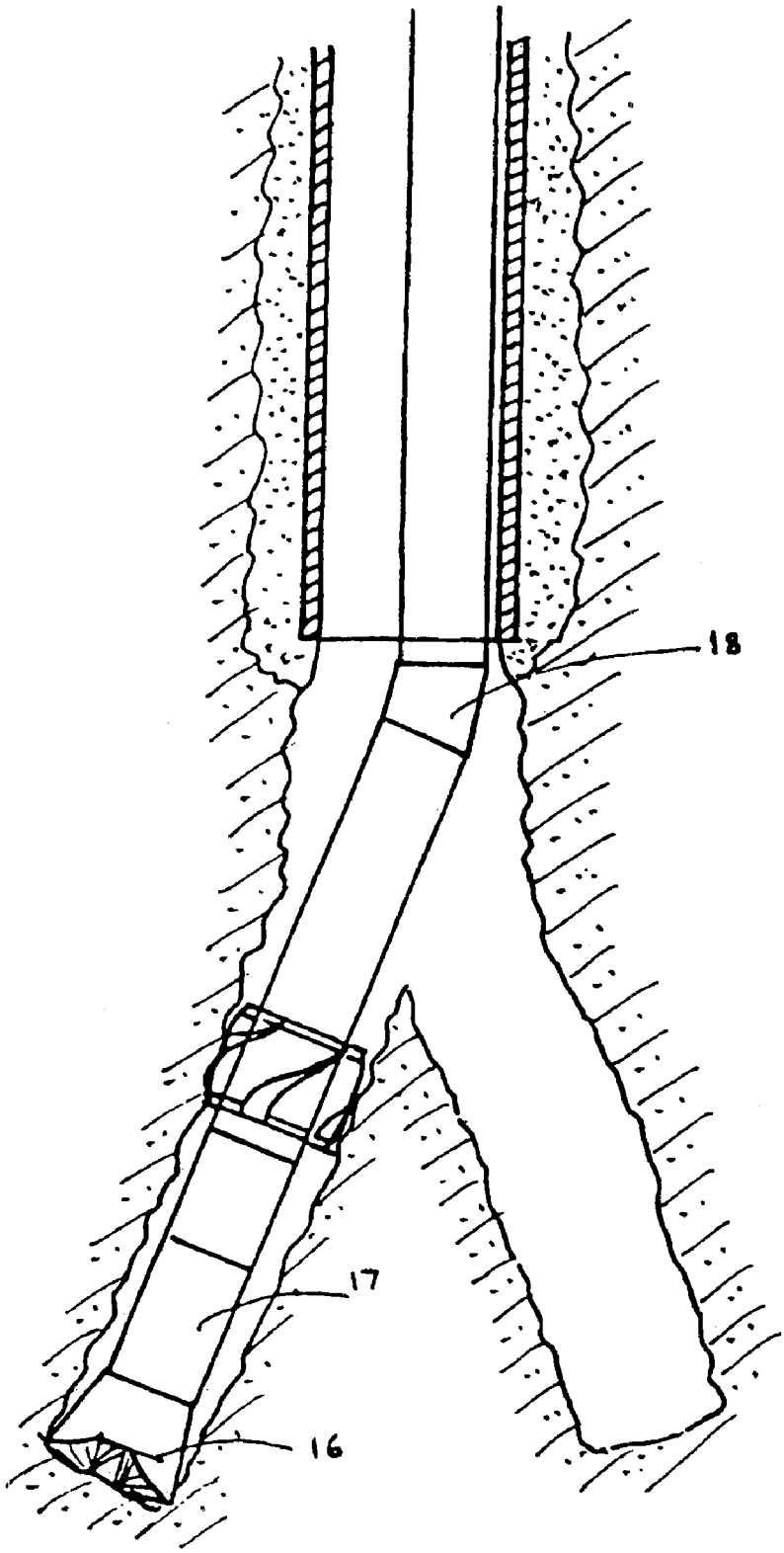
FIG. 2 and 2a are vertical cross sections showing schematically the successive phases of the operations required in Case 2.

In Case 2, from a vertical cased well drilled and cemented by conventional techniques, the casing shoe is drilled out and two short (ca. 50 ft long) smaller diameter twin deviated holes are drilled through the bottom of the vertical well. This uses, for instance, a bit (16) driven by a downhole motor (17) connected to a bent sub (18), in the type of downhole assembly commonly used for drilling horizontal wells (see FIG. 2).

With deviation angles of only a few degrees from the vertical, the separation between the two holes is only of a few feet at the bottom and of a few inches at the top. Consequently, it may be advantageous in some formations, to start the drilling operation by first under-reaming a single large-diameter short hole below the casing shoe, from which the twin small-diameter drainholes are then started, with opposite orientations. Several other available techniques are also familiar to those skilled in the art of drilling oil wells and may be used to achieve the same result.

Figure 2A:
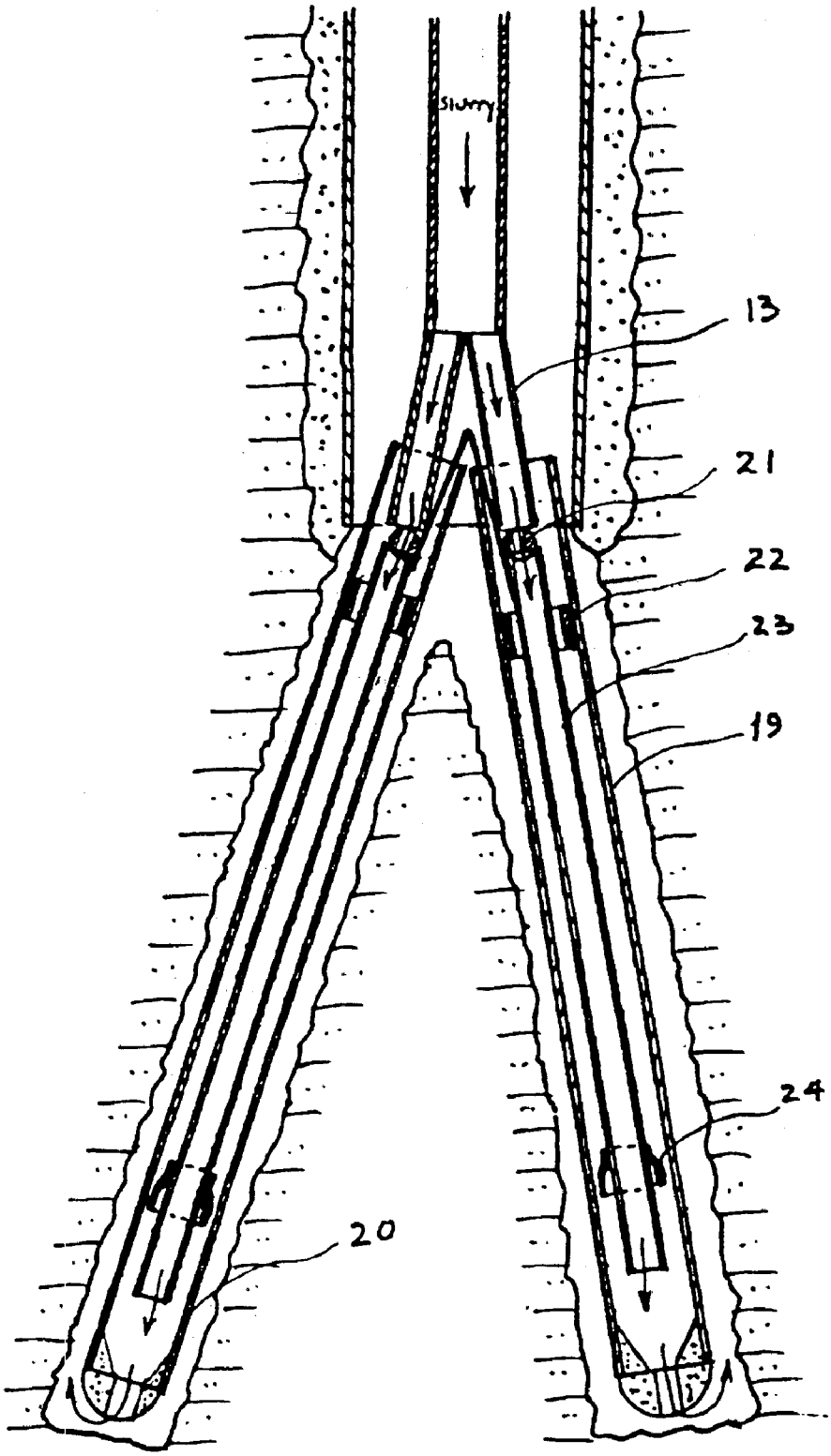

Two short (ca. 60 ft long) intermediate liners (19), (20) are run in and sealed one in each of the deviated holes. The cementing operation uses Furan or other known heat-hardened resin/cement slurries as seal. It may be performed in a single trip by making-up and running-in at the end of the work string as assembly including, as shown in FIG. 2a:

an inverted Y tubing nipple (13), two spherical seal articulated union joints (21), one at each end of the two branches of the inverted Y nipple, two liner releasing tools (22) equipped with a tail pipe, one for each intermediate liner string. Each tailpipe (23) is fitted with a cup-type packer (24), which closes the annular space between liner and tailpipe during cement injection and displacement behind the liner, but opens during the reverse circulation of mud, for cleaning after the liners have been released from their respective latching tool. The cementing string with its two tailpipes is then pulled out.

Figure 2B:
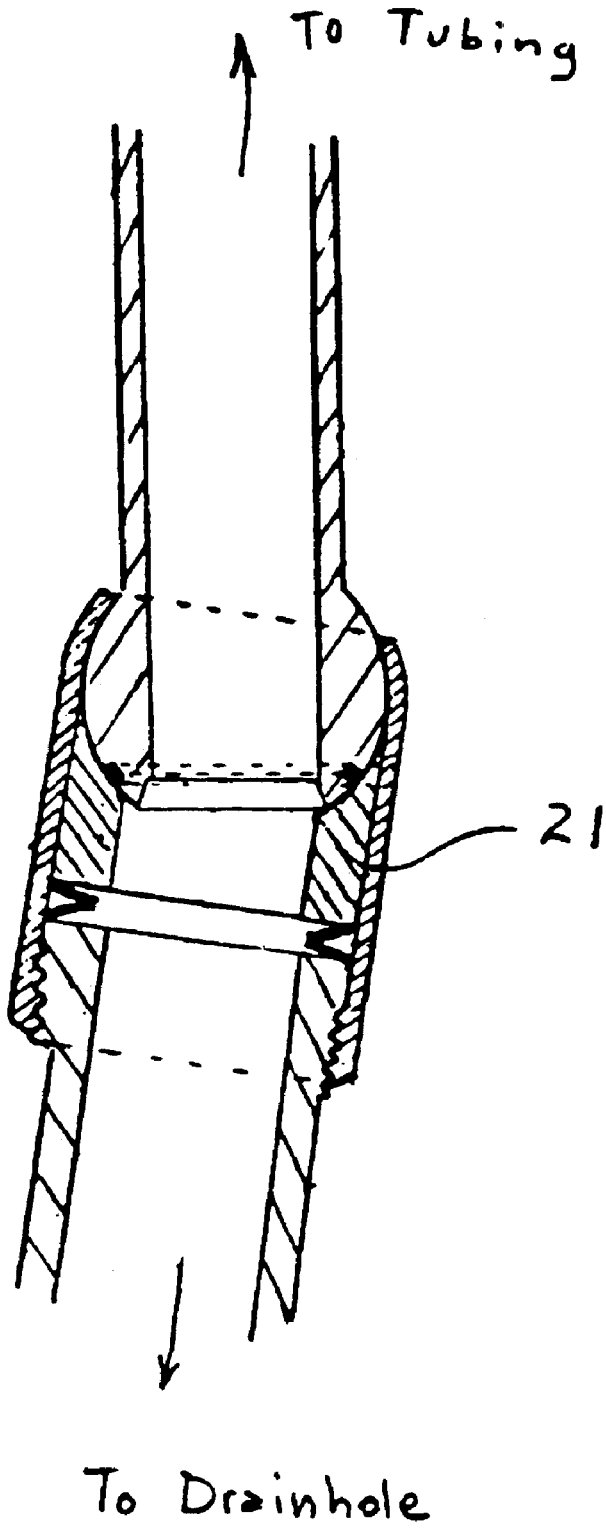
FIG. 2b is a vertical cross section of the spherical seal union joint used in Case 2 and in subsequent cases.

FIG. 2b shows in detail the spring-loaded spherical seal articulated joint (21).

After this cementing operation, the vertical casing is thus tied-in and sealed to each intermediate liner over an overlap interval of about 10 ft. Entry to one of the liners is closed by a temporary plug set by wireline and drilling of a drainhole proceeds through the other intermediate liner, using a bit driven by a conventional downhole motor and bent sub assembly.

After reaching total measured depth, a smaller diameter liner is run-in, hung into the lower part of the intermediate liner and cemented at least from the intermediate liner to the start of the horizontal segment of the drainhole. An alternate method is to use a coiled tubing as drill string and to abandon the bit and motor in the hole, prior to cementing it as a liner. Gravel packing and/or sand consolidation techniques may be used. The lower part of the liner may be slotted and equipped with screens. Otherwise, this part of the liner may be cemented and selectively perforated using known perforating guns.

In view of the relatively small diameter of the liner (typically less than 2.5 in.), a thin-gauged coiled tubing is preferred as liner.

Figure 2C:
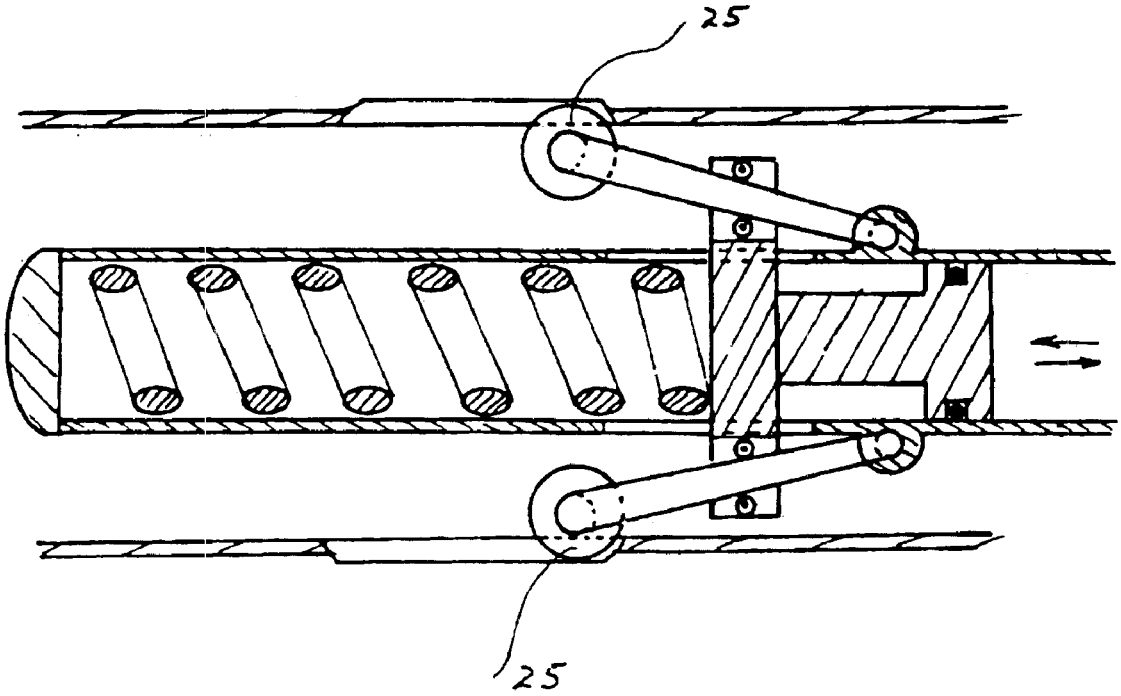
FIG. 2c is a schematic vertical cross section of a hydraulically operated tool for punching multiple slots into thin gauge liners.

The annular space behind the liner may be gravel packed first by displacement of a sand slurry, in direct circulation, followed by a reverse circulation of the sand slurry. After cementing the upper part of the coiled tubing liner, its lower part is mechanically slotted by running through it, on a smaller diameter coiled tubing, a hydraulically actuated punching tool in which multiple articulated edge-cutting wheels (25) or punches are periodically pressed against the inner surface of the liner to punch slots into the coiled tubing liner, thus opening flow paths to the gravel packed annulus. FIG. 2c shows a schematic view of the hydraulic punching tool. Sand consolidation by injection of a suitable thermosetting resin as a mist in a hot gas or steam or as a suspension or foam in a liquid may then be applied to the gravel pack and cross-linked to stabilize it, with minimum permeability reduction.

After removal of the temporary plug in the second intermediate liner, the same procedures are used to drill, gravel pack, cement, and selectively perforate the second drainhole, thus completing all drilling and tie-in operations for both drainholes.

Figure 2D:
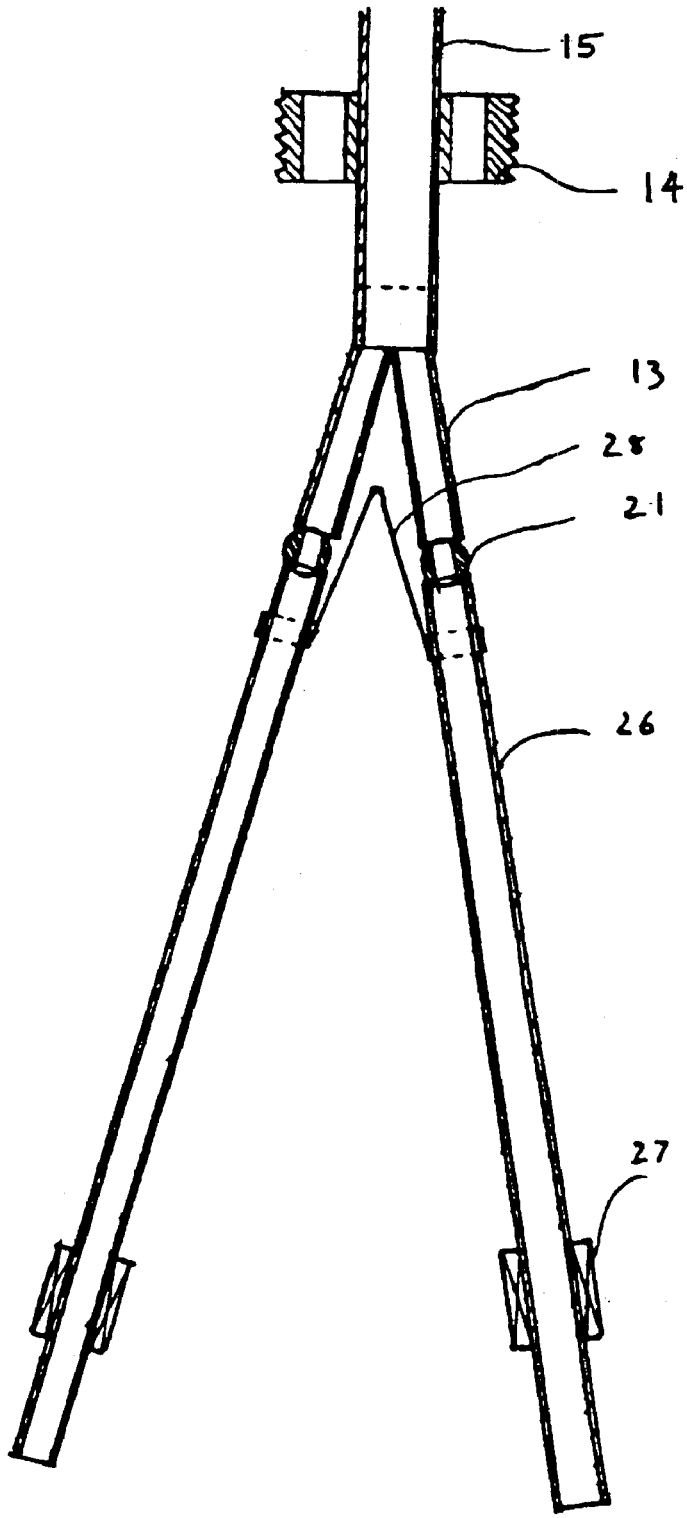
FIG. 2d is a schematic vertical cross section of the tubing completion assembly used in Case 2.

Well completion is achieved by make-up, run-in and set of the production tubing string assembly, shown in FIG. 2d. It consists of a tubing connected to:

a conventional hanger (14), an inverted Y nipple joint (13) with each of its two lower branches equipped with a spherical seal union joint (21) and a connector tube (26) equipped, near its end, with a conventional packer (27) of the type which can be set hydraulically or by wireline.

The tubing is oriented so that the tail end of each connector tube penetrates into the upper part of one of the cemented intermediate liners while rotating slightly around the articulation formed by its union joint. A spreader spring, (28) linked to the upper part of each articulated tube facilitates its insertion into the corresponding drainhole liner.

Each of the packers is then set, to tie-in each articulated connector tube to its corresponding intermediate liner. After leak-testing, the tubing hanger is then set and the well head nippled up. Again, suitable known artificial lift equipment components may have been included in the tubing string, if it is expected that the well will not be flowing at an economic rate without gas-lift or pumping.

CASE 3 (DEVIATED CASED WELL)

Figure 3:
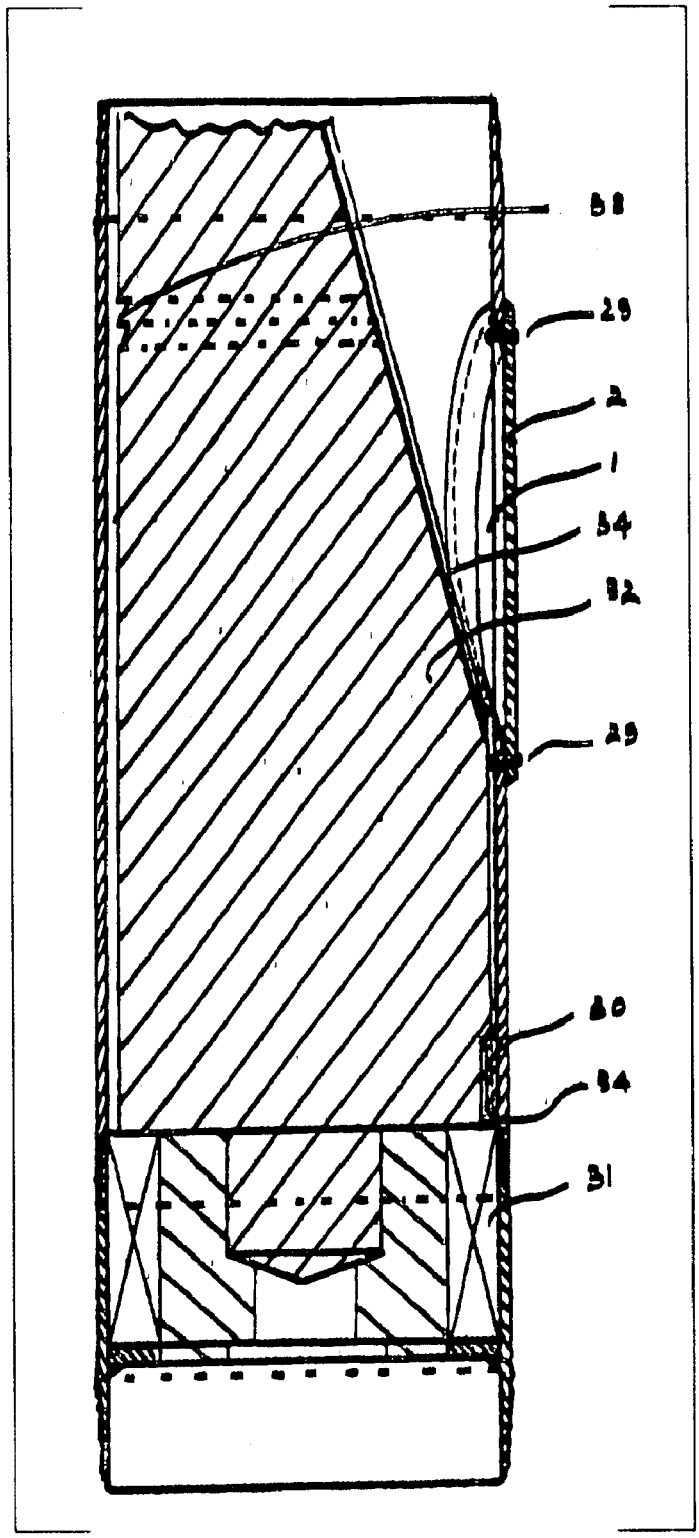
[FIG. 3 is a vertical cross section of a special casing joint equipped with a drillable packer and retrievable whipstock for drilling and completion of the side-tracked hole of Case 3.]

*Case 3 includes a special casing joint equipped with a drillable packer and retrievable whipstock for drilling and completion of a side-tracked hole.* In Case 3, a vertical well is drilled, with its lower 50 ft deviated at the angle required to kick-off a horizontal drainhole and oriented in the direction selected for the drainholes. A special casing string is made-up, run-in and cemented by known techniques into the vertical and deviated portions of the hole. It consists of a shoe, a float collar and a special casing joint [(FIG. 3)], *see FIGS. 3a-3c,* located at a depth slightly above that of the start of the hole deviation. This casing joint presents an elliptical window machined into the casing with a downward orientation of a few degrees from the vertical. [The] *As previously shown in FIG. 1, the* window (1) is again plugged off with a drillable plate (2) made, for instance, of a soft metal and shaped to generally conform with the casing surfaces. The plug is firmly attached to the casing by means of drillable fasteners [(29)]. Its orientation is also indicated by a vertical drillable key or groove (30) in the casing joint inner surface at or near its lower end.

After displacing the cement slurry behind the casing, the string is rotated to orient the plugged window in the direction opposite to that of the deviated portion of the hole. This is done by marking the window direction on all the uphole joints of the casing, up to the rig floor. After the cement has set, a whipstock drillable packer (31) is run-in and set below the special casing joint at a predetermined depth. A retrievable whipstock (32) is then oriented towards the plugged window, using the casing joint's orientation key or groove, fitted in a matching groove or key in the whipstock's outer cylindrical surface. The oriented whipstock presents a curved guiding surface which matches the depth, width and orientation of the window, so that a side-tracked hole (33) of diameter smaller than the casing ID may be kicked-off by drilling the window plug. The hollowed curve of the whipstock also presents a central alignment groove (34) corresponding to the lowest point of the elliptical window (1). The base of the whipstock is preferably equipped with a rubber cup for catching excess cement during later operations.

Figure 3A:
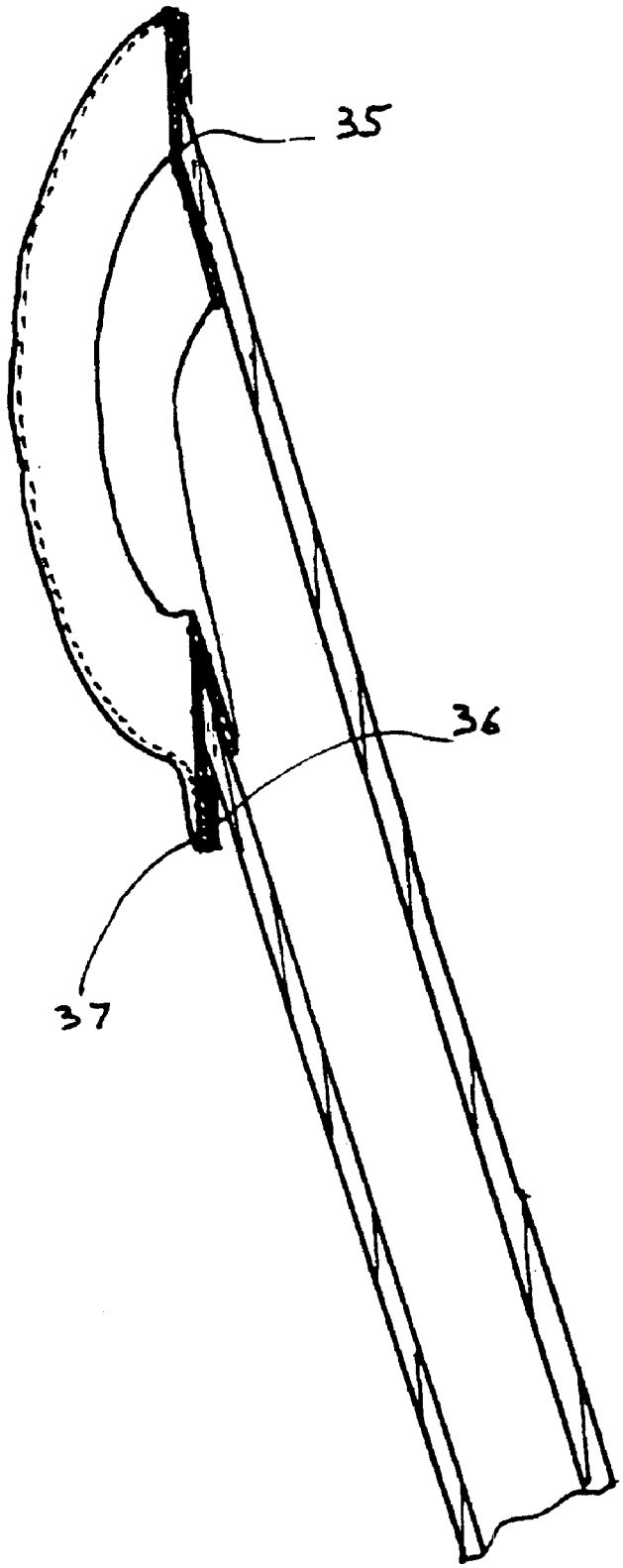
FIG. 3a is a vertical cross section of an intermediate liner.
Figure 3B:
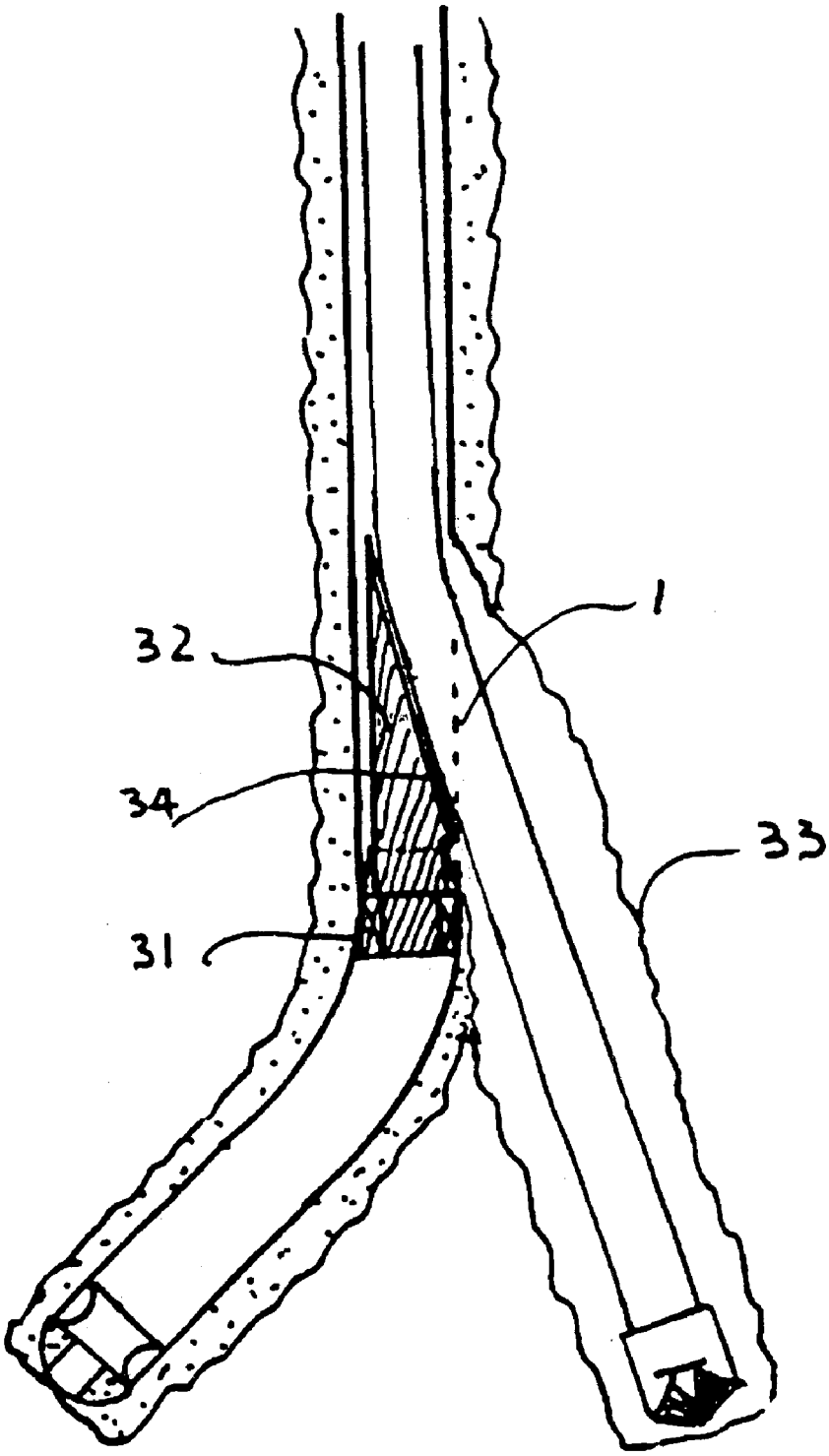
FIG. 3b is a vertical cross section of the deviated cased well and side-tracked hole of Case 3.
Figure 3C:
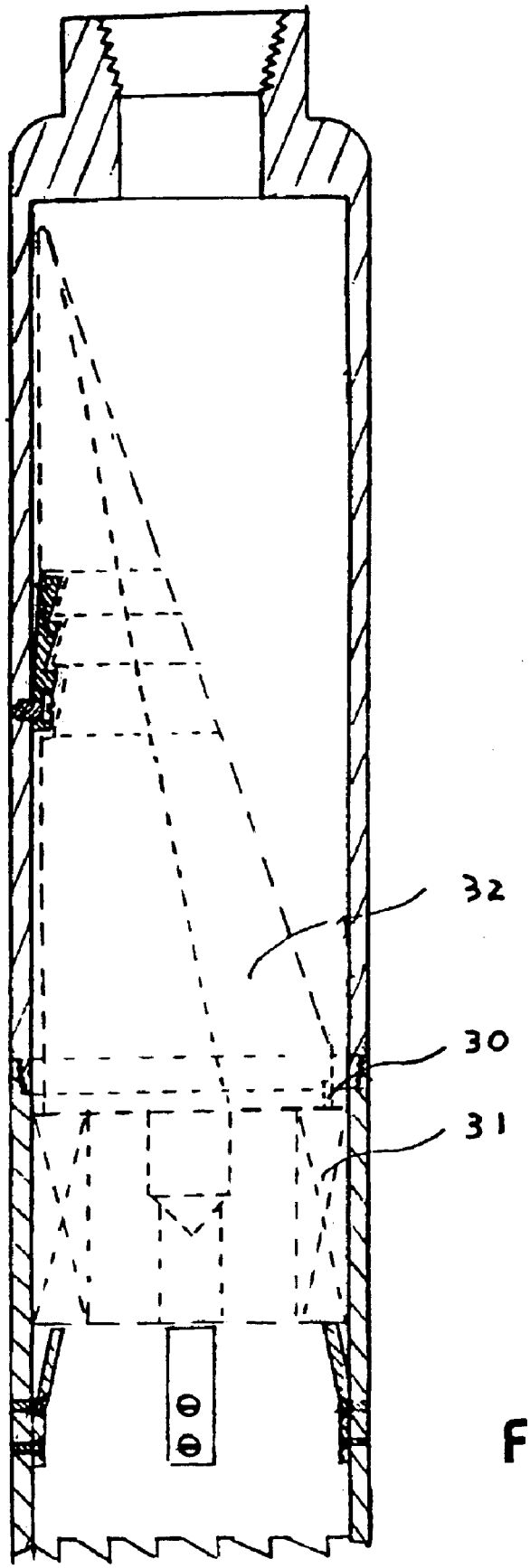
FIG. 3c is a vertical cross-section of the overshot-type tool used in Case 3.

After drilling out the plug and drilling a side-tracked hole through the window, to a depth of about 60 ft, an intermediate liner is run-in through the window and cemented by known techniques. The upper end of the liner has been machined as shown in FIG. 3a so as to conform with the inner edge of the window (1) and its edge is equipped with an elliptical collar (35) made of drillable metal, which conforms with the inner surface of the casing at the window's edge. The outer surface of the collar is covered with a rubber gasket or plastic sealing material (36) and the lowest part of the collar presents a key (37) which matches the central alignment groove (34) in the retrievable whipstock, so that the intermediate liner end may be oriented and guided to provide a closely fitting contact between the drillable elliptical collar and the casing window's edge. The intermediate liner is equippped with a cementing shoe and latched to a liner releasing tool equipped with a tailpipe and a cup-type packer for cementing by the same techniques as in Case 2. After displacement of the cement slurry behind the liner, a ball or plug is dropped to close the shoe and casing mud pressure is increased to firmly apply the drillable collar against the inner surface of the casing, while reverse circulation is established through the tailpipe to remove any excess cement.

After the cement has set and the cementing string has been pulled out, the outer saw-tooth grooves [(38)] of the whipstock are latched into an overshot tool equipped with a milling edge to drill out the elliptical collar (35) and the whipstock is pulled out. The supporting whipstock packer (31) is also drilled out and pulled out with the overshot milling tool, which also is equipped at its lower end with a suitable packer-latching device. These operations leave full openings in both the deviated casing and the side-tracked intermediate liner. Both of them provide a relatively large deviated casing and a slightly smaller liner to be used as the respective starting points of two drainholes, in the same way as in Case 2, but the drainhole diameters and that of their respective liners may be greater than that of Cases 1 or 2.

Liner gravel packing, cementation and liner hanging respectively in the deviated casing and in the side-tracked intermediate liner may be done either as in Case 1 or as in Case 2, depending upon the drainhole diameter.

Well completion is done as in Case 2, except that the tie-in of the articulated connector tubes may be obtained either with packers, as in Case 2 or with polished bore receptacles, and seals as in Case 1.

CASE 4 (STACKED DRAINHOLES)

In Case 4 the drainholes are stacked, one above the other, so that the full diameter of the casing is available as a starting point for each drainhole. Here again, a special casing joint (or joints) now presenting two elliptical windows at two different depths and oriented with opposite bearings, is included in the casing string during make-up to provide the starting points of the drainholes.

In a first embodiment (FIG. 4), the drillable plugs closing the windows during run-in are located at the ends of telescopic liner stubs (39) oriented downward at the kick-off angle (typically 2 degrees). Each plugged stub is later hydraulically extended into an under-reamed portion (40) of the vertical hole filled with cement slurry during the casing cementation, to serve as guide for a bit driven by a downhole motor connected to a bent sub in a conventional drilling assembly. Each of these two stubs is supported during run-in and guided during its outwards extension by two tubular guides or cages made of drillable metal. One of them (41) is fixed, it is attached to the casing by drillable metal fasteners. The other (42) is mobile and slides within the fixed cage (41) over only half of the stub extension, while providing a cantilevered sliding internal support to the extended stub. The upper end of the stub is terminated by a drillable collar (35) and gasket (37) as in Case 3.

For 7 in. OD liner stubs at a 2 degree angle in a 9⅝ in. OD casing the elliptical casing window would be 200.6 inc. by 7 in. For a 30 in. ID reamed cavity, the total stub extension length is about 286.6 in. and the stub maximum length is about 487.2 in. This is because both ends of the stub are machined to conform with the elliptical window, leaving in the middle a length of about 86 in. of tubular segment. This length is sufficient to provide tie-in both with the cemented drainhole liner and also with a connector tube linked to the tubing. With the vertical casing and extended stubs cemented, drilling of the extension guides and other internals leaves two 7 in. OD stubs as pockets from which to start drilling the drainholes, using the usual bent sub and downhole motor assembly including the navigation system for angle build up and directional control. The first step is to drill out the stub's end plug. After reaching total measured depth, a liner assembly is made-up and run-in through the stub. Gravel packing and cementing of the uphole liner proceed as in Case 1. The upper end of the liner is centered and hung into the lower part of the stub. It is also terminated by the female part of a polished bore receptacle. The work string is disconnected from the polished bore receptacle and pulled out. The same operations are repeated for the second drainhole, leaving the well ready for tubing completion.

Figure 4A:
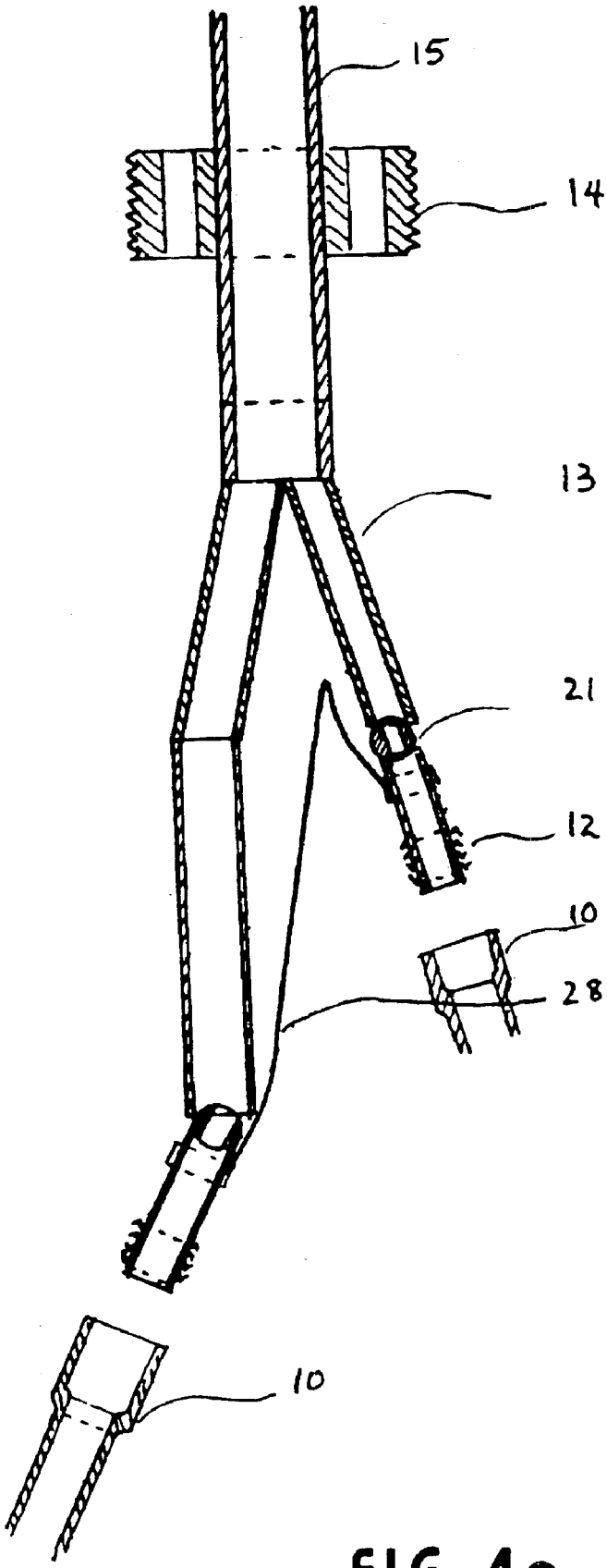
FIG. 4a is a vertical cross section showing connection to the stubs by means of articulated connector tubes.
Figure 4B:
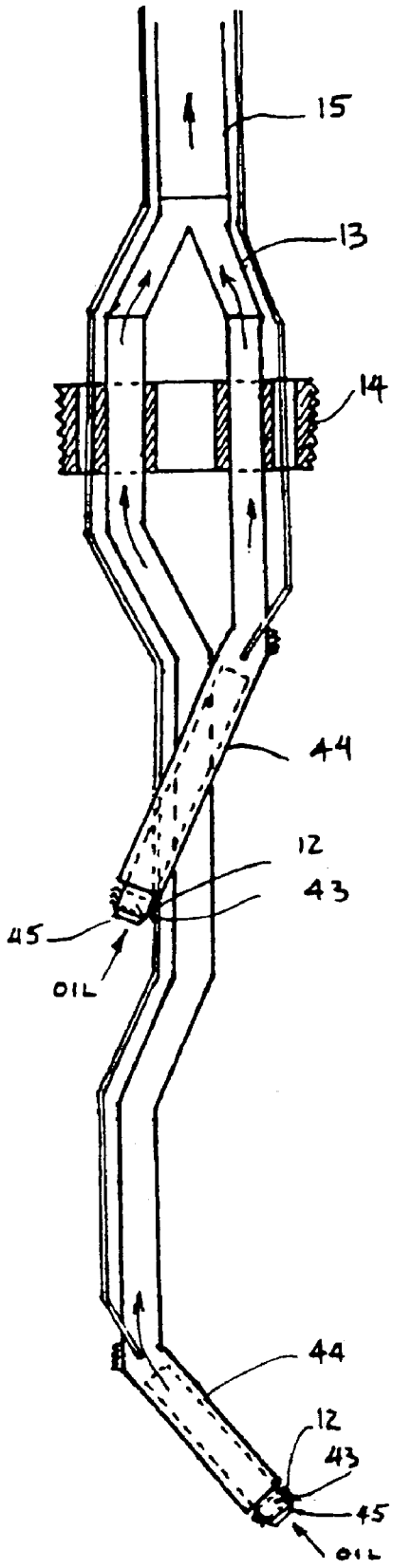
FIG. 4b is a schematic flow diagram showing the connection to the stubs by means of telescopic connector tubes.
Figure 4C:
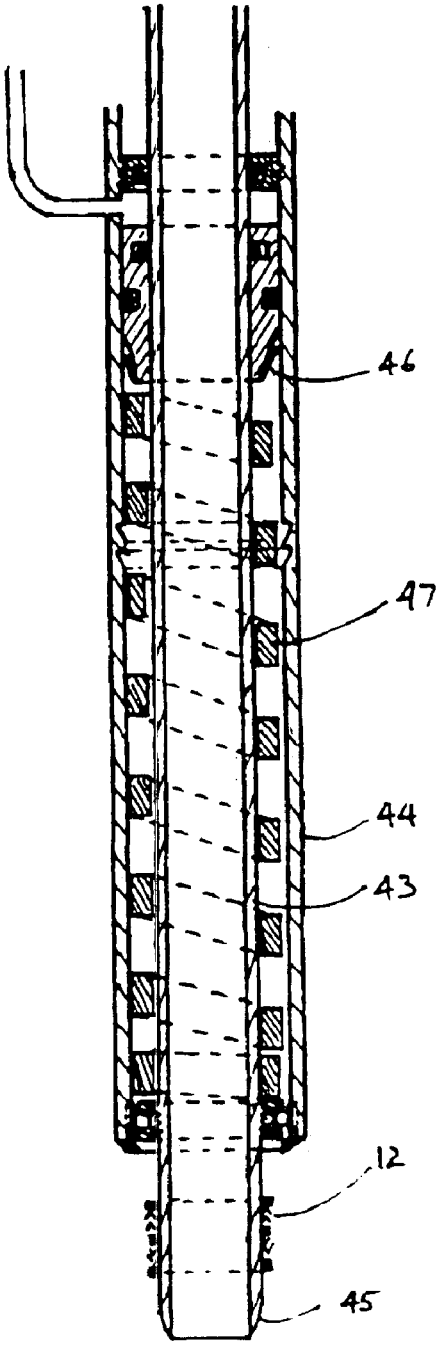
FIG. 4c and 4d are vertical cross sections showing telescopic connector tubes respectively in the retracted and in the extended positions.
Figure 4D:
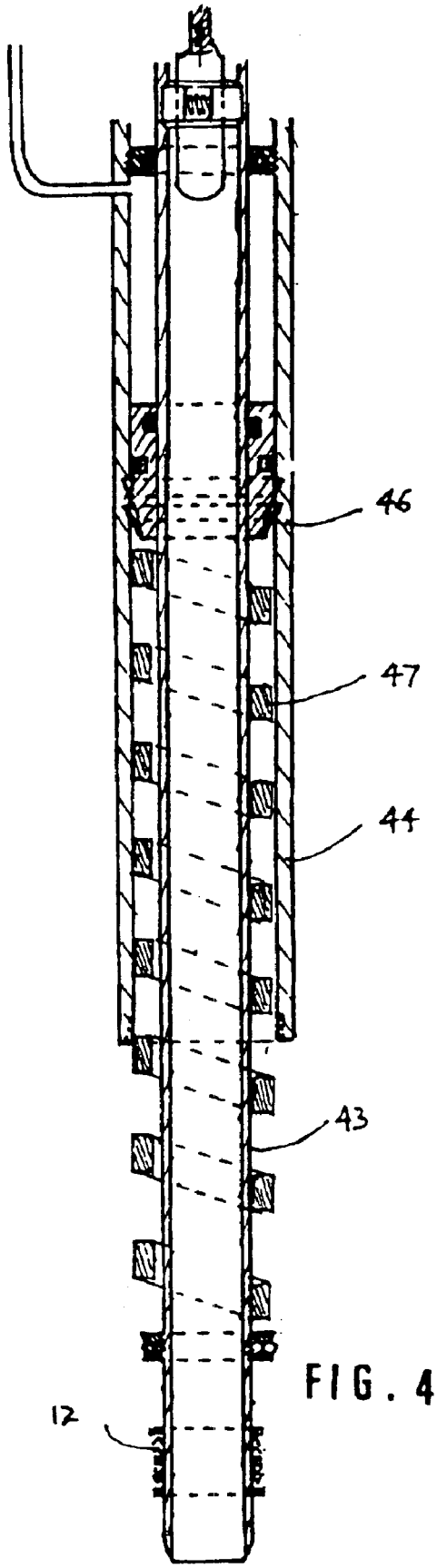
Figure 4E:
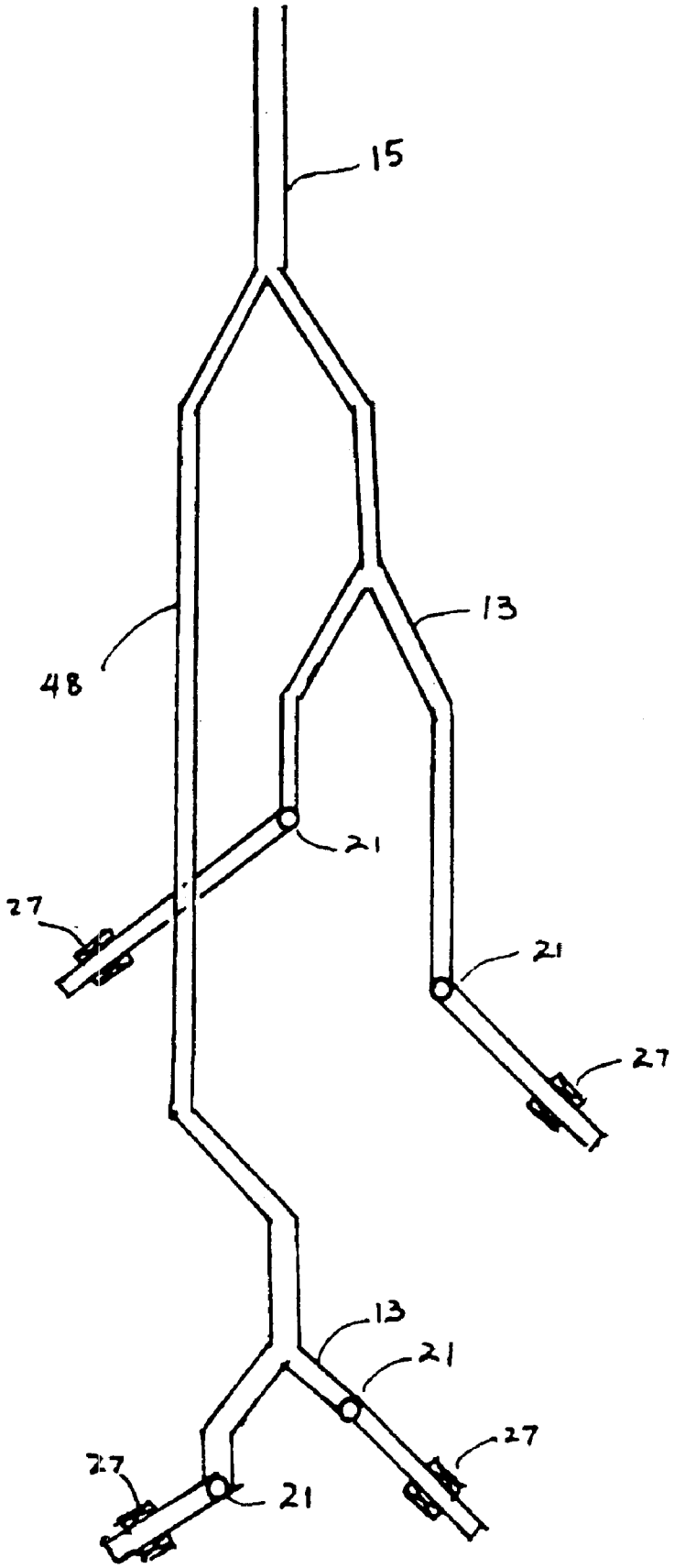
FIG. 4e is a schematic vertical cross section showing the tubing completion assembly for two pairs of stacked drainholes in Case 4.

The tubing completion assembly, shown on FIG. 4a, again includes a tubing hanger (14), an inverted Y nipple joint (13), two special seal union joints (21), each terminated by a connector tube stinger equipped with chevron seals (12). A bow spring (28) between the two stingers facilitates their entry into the stubs where they are mated with their respective polished bore receptacle (10). After leak testing of the connections, the tubing hanger is set and the well head nippled up, as in Case 3. The bow spring may be compressed during run-in and released by a suitable wireline tool when reaching the proper insertion depth for the connector tubes. This provision is especially useful when simultaneously connecting more than two connector tubes. In another embodiment, shown on FIG. 4b, connection of the tubing to the drainholes is by means of telescopic connector tubes (43). These are located in cylindrical cavities (44), connected to the two vertical lower branches of the inverted Y nipple joint (13) at the kick-off angle. The lower end of each connector tube (43) is equipped with chevron seals (12), supplemented in some cases by an end to end spherical metal/metal seal (45). A spring (47) triggered from the surface by hydraulic or wireline means strongly applies the extended connector tube's spherical end against a corresponding spherical cavity forming the bottom of the polished bore receptacle (10) to provide this metal/metal seal. In FIG. 4c, the connector tube is locked into its extended position, but may be retracted inside the cylinder body by shearing off the latch pins (46) with a wireline tool as shown in FIG. 4d, when it is necessary to disconnect and pull out the tubing for a well work-over. The upper end of the body (44) is equipped with dogs which bite into the inner surface of the casing when the telescopic connector tube is fully extended and pressed against the bottom of the polished bore receptacle. It will be apparent to those skilled in the art that this is only one of many possible ways of achieving both a spring-loaded metal/metal seal and anchoring in the extended position of the telescopic tube while providing means for its eventual retraction and pull out. The invention is not limited to the example described herein.

In yet another embodiment, the casing includes two special joints of the type used in Case 3, located one above the other, separated by an interval sufficient for setting a packer and the two plugged windows oriented in opposite directions. Again, as in Case 3, a drillable whipstock packer is set below one of the windows. The retrievable whipstock is latched into the packer and drilling of the window and side-tracked hole proceeds. A short intermediate liner, as in Case 3, is run-in through the window and cemented. The procedure, repeated for both windows, leaves two side-tracked intermediate liners from which the drainholes are drilled, and their liners are hung and cemented. After drilling out the drillable elliptical collar of each cemented intermediate liner, the entire casing space is available for installing the tubing completion assembly.

The previous embodiments which leave full access to the stacked drainholes also allow to drill, gravel-pack, and tie-in any number of drainholes, equipped with cemented liners, one above the other, by using as many stubs or intermediate liners as there are drainholes.

The commingled production from all drainholes may be discharged into an oil sump formed by the casing below a production packer and pumped to the surface through a single production tubing. The pump location in the tubing may be above the packer, or below it in a tailpipe tubing extension. With such a simple tubing completion assembly, the access into each of the drainholes of logging or cleaning tools is obtained by means of a suitable kick-over tool of known design.

The tubing completion assembly may also be the same as in Cases 2 and 3, which provide a continuous path from the surface to each of two twin drainholes, and greater operational flexibility.

The types of tubing completion assemblies including telescopic connector tubes or articulated connector tubes, described above for two stacked drainholes, are also applicable to more than two stacked drainholes. If the drainholes are grouped by pairs, connected to a single production tubing, the number of parallel tubes in the casing at any depth is reduced to only three, as shown on FIG. 4e. These are:

the two tubing connected to the lower branches of the inverted Y nipple joint (13), for a given pair of drainholes, the production tubing extension (48) leading to the other drainhole pairs below the first one.

This number may be increased to four if the hydraulic or jet pump is located below the top pair of drainholes and if the tubing carrying the power fluid to the pump is parallel with the production tubing, but the number of possible stacked drainholes, which is only limited by the casing length, may be much greater.

CASE 5 (ARTIFICIAL LIFT)

In all previous cases, it was assumed that reservoir pressure and produced gas expansion are sufficient to convey the production stream to the surface, or at least up the curved portion of each drainhole (up to 500 ft high) without excessive reduction of the total pressure draw down, so that a single artificial lift system providing suction at the base of the production tubing can be used for both drainholes. This may be a conventional gas-lift valve supplied with compressed gas through the casing/tubing annulus. Conversely, the production stream may be conveyed to the surface through the annulus while lift gas is supplied through the tubing. In that event, a packer must be added to the tubing hanger, a diverter valve must be included in the tubing above the packer to convey the production stream to the annulus and a plug must be located in the tubing between the open diverter valve and the bottom gas-lift valve.

Similarly, the commingled production stream from both drainholes may be pumped to the surface through the tubing or through the annulus using known types of pumps. These can be mechanically actuated by sucking rods, by rotating rods (progressive cavity pumps) or they can be actuated hydraulically. Jet pumps may also be used as well as electrically driven submersible pumps. Pump selection criteria and the importance of an optimum depth of the pump in the well are well known from those skilled in the art. The pump may be anchored either in the tubing or in the annulus, depending upon reservoir and well conditions, including the need to handle gas or sand production.

Figure 5A:
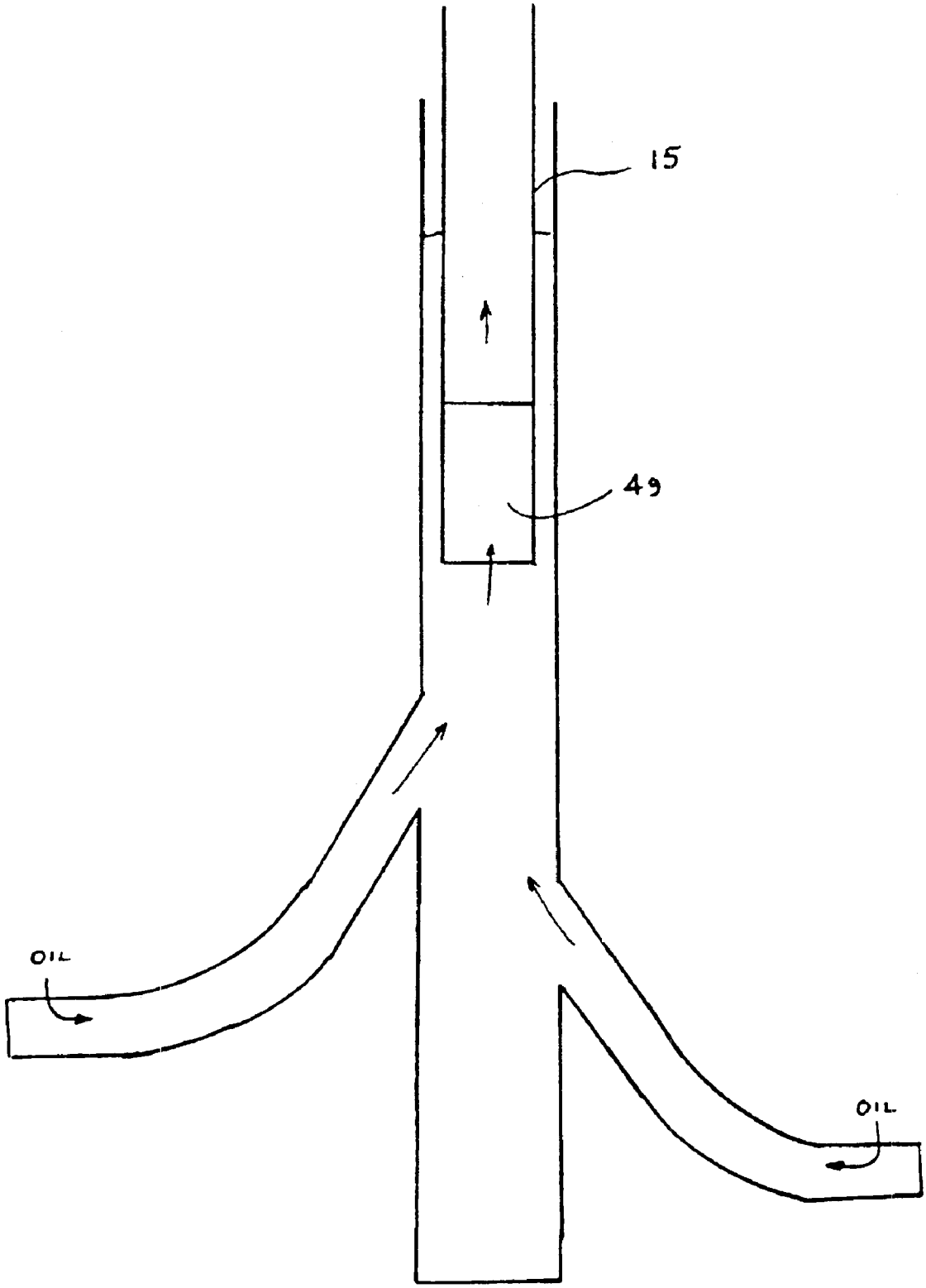
FIG. 5a, 5b and 5c are schematic vertical cross sections of a well and twin drainholes, showing different possible pump locations.

It is one of the main advantages of connecting two or more drainholes to a single vertical well to allow the possibility of using a single pump (49) as in FIG. 5a for all the drainholes, thus reducing capital and operating costs of pumping the production stream.

Figure 5B:
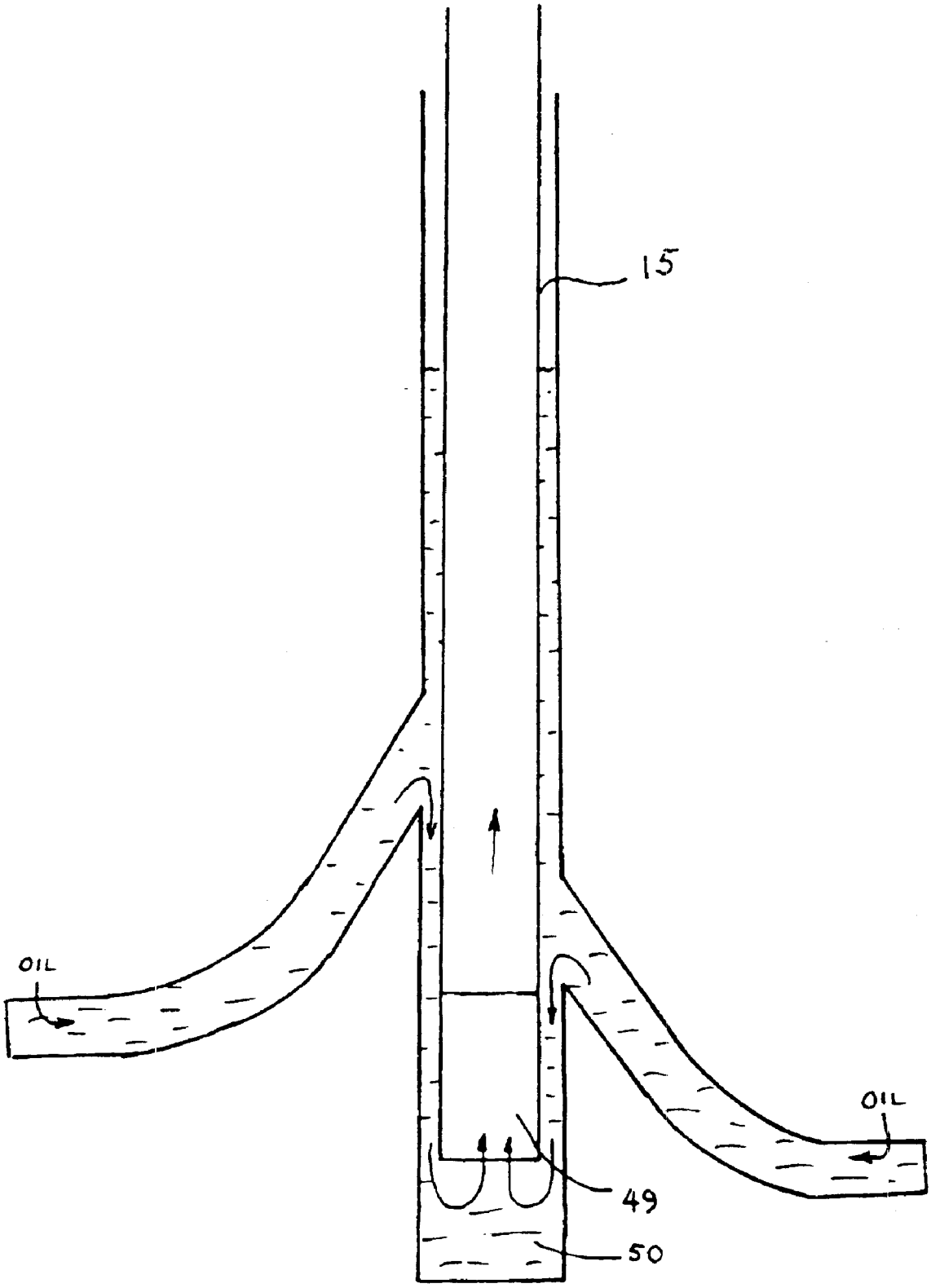
Figure 5C:
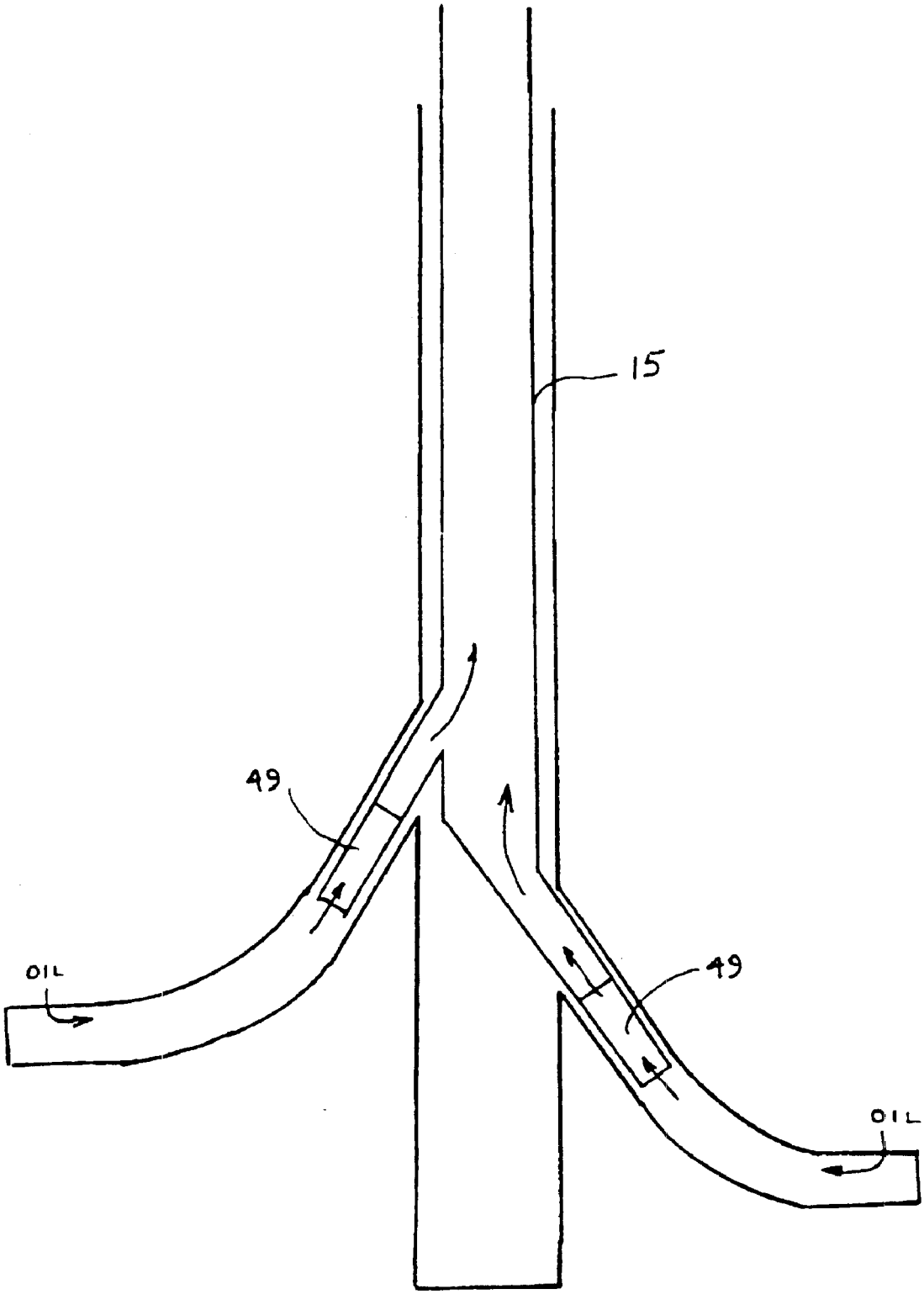

It will be shown later that this possibility is, however, limited in the case of some under-pressured reservoirs. Well completion equipment and novel assembly procedures have been developed to extend the possibility of using a single pump by locating it, as in FIG. 5b, below the drainholes kick-off points. Finally, special equipment and methods are described for the installation and use of a pump in each drainhole, if necessary, as in FIG. 5c.

These considerations on artificial lift are equally applicable to new wells and to the re-entry into an existing casing, to vertical as well as to deviated cased wells.

CASE 6 (FLOW THROUGH A SYPHON)

Figure 6A:
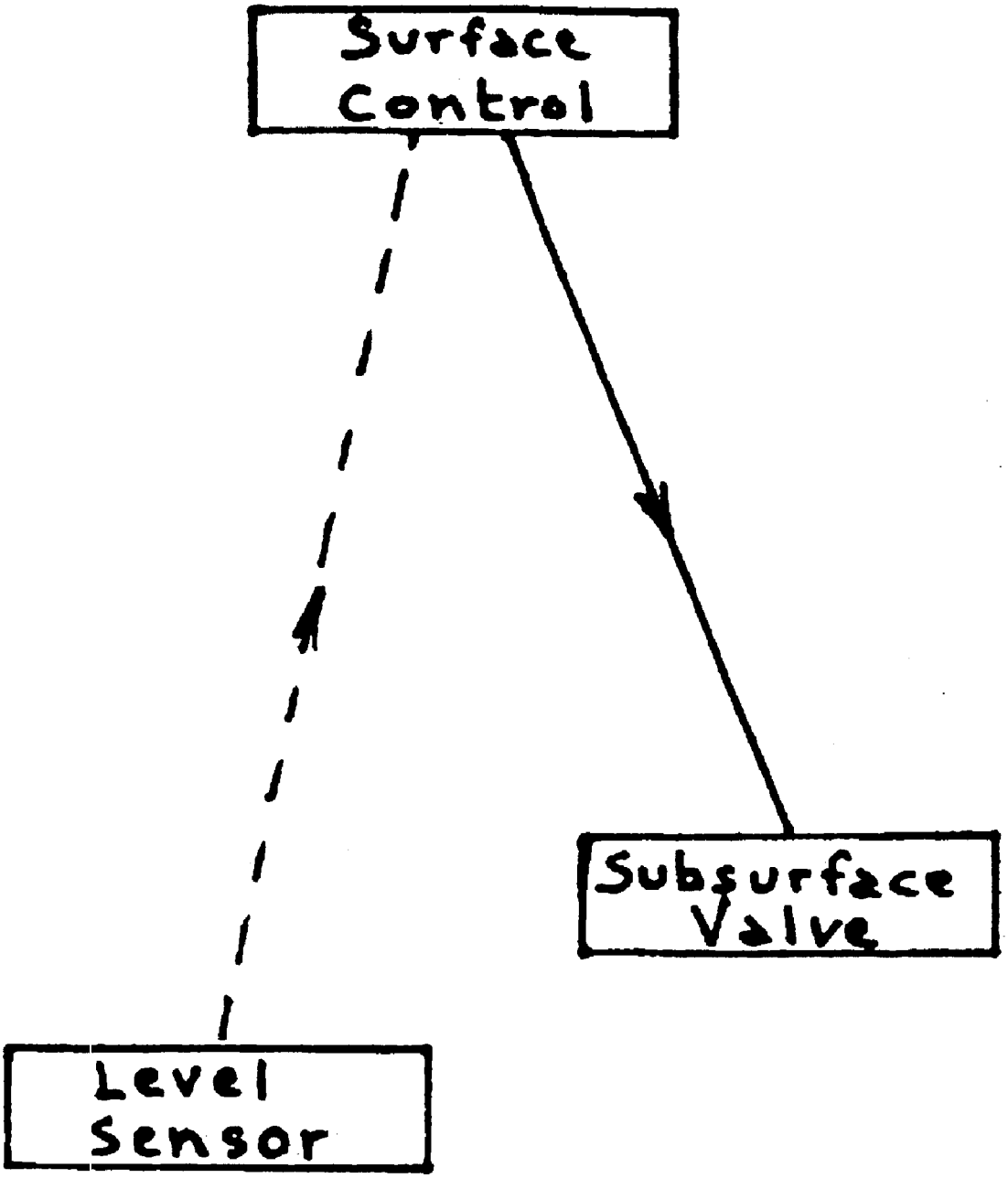
FIG. 6a is a schematic diagram showing the operation of the periodic gas purging system.
Figure 6B:
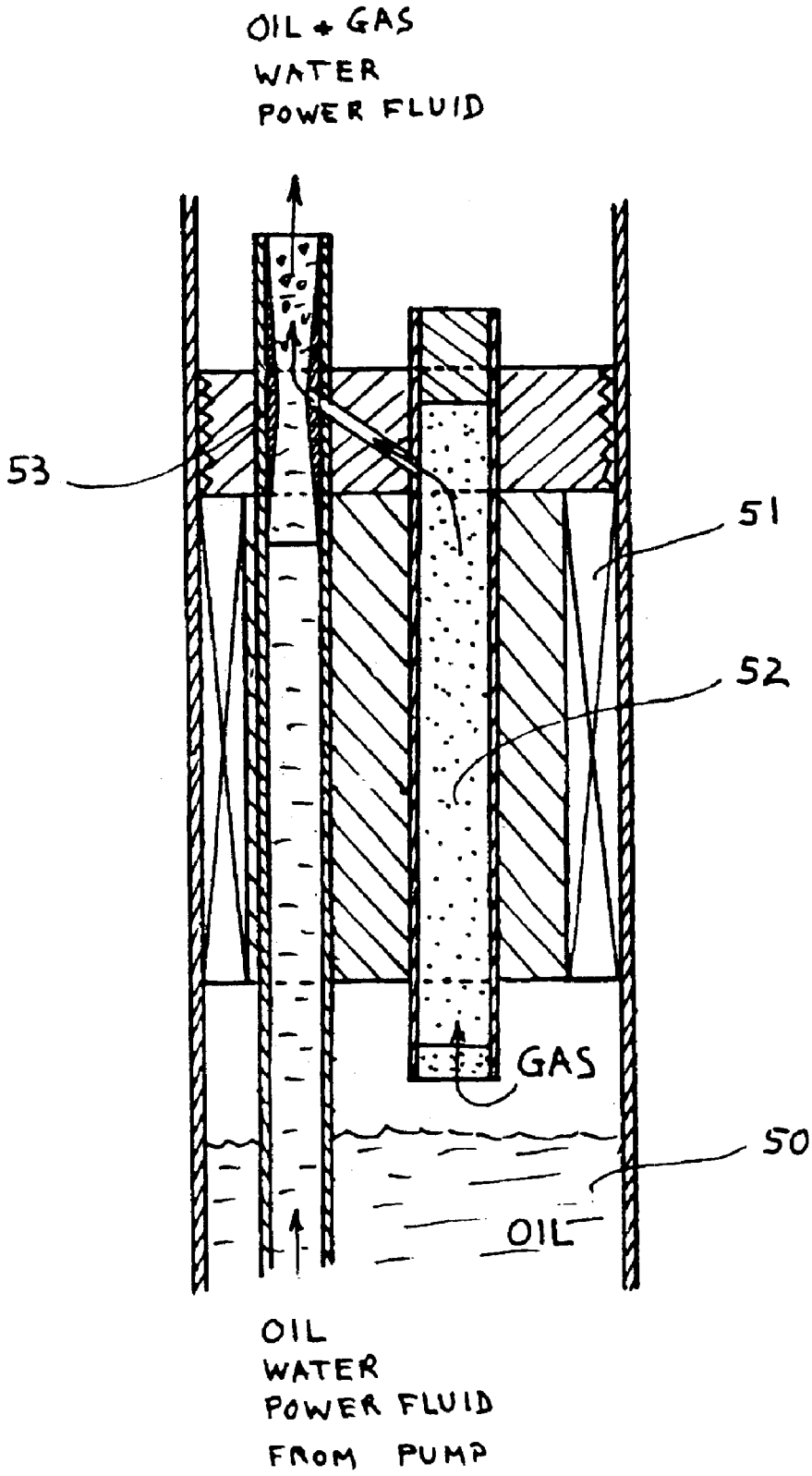
FIG. 6b is a cross section of the permselective plug and venturi used for continuous gas purging.
Figure 6:
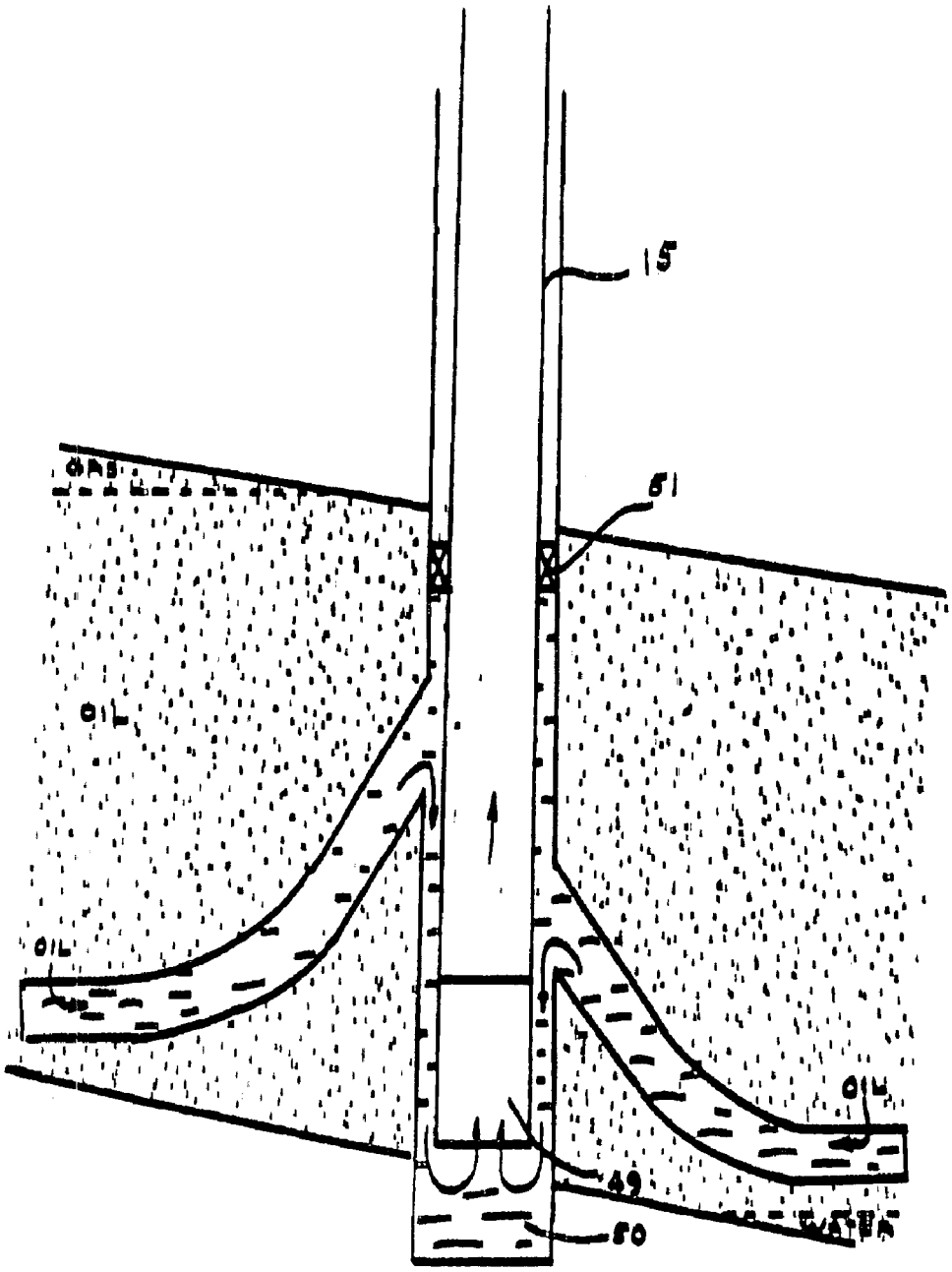
[FIG. 6 is a schematic vertical cross section of a well and two drainholes, showing the various fluid levels in the reservoir.]

In under-pressured reservoirs containing low GOR oil, reservoir energy may be insufficient to convey the production stream up to a pump or gas lift valve located above the kick-off points of the drainholes. The difference in elevation between such a pump and the fluids entry points in the horizontal part of the drainholes is greater than the drainholes radius of curvature, which may be up to 500 ft. In addition, there are significant friction pressure drops through the horizontal and curved portions of small-diameter liners, which may reduce the calculated net flowing fluid head at the pump [(49)] inlet to a value below the required minimum NPSH of the pump. This indicates that cavitation is likely to occur in the pump, with highly detrimental erosion effects and a reduced flowrate. To alleviate this problem, flow from each drainhole may be directed to an oil sump (50), with the pump taking suction at or near the bottom of the sump. *See FIG. 6b.* The top of the sump is closed by a packer (51) a short distance above the highest kick-off point. It constitutes the apex of a kind of syphon (see [FIG. 6]*FIG. 6b*) for each drainhole. For very low GOR oil, frequently present in under-pressured mature reservoirs, the flowing pressure at that point may still be well above the bubble point of the production stream, so that the risk of cavitation and break-up of the de-celerating liquid stream at that point is much less than it would be in a pump at the same location. The flowing pressure at the apex, plus the liquid head in the sump, provide a pump suction pressure exceeding the minimum NPSH required, thus eliminating the risk of cavitation in the bottom pump.

Instead of a pump, an intermittent flow gas lift system may also be used for the same purpose. In this known system, a gas piston lifts an oil slug up the tubing after the standing valve at the bottom has closed. This is equivalent to a beam pump, but more tolerant of sand production.

The drilling and tie-in equipment and procedures are the same as in Cases 1, 2, and 4, except that a sump is drilled and cased vertically below the lowest kick-off point. In Cases 1 and 4, that sump may be created by placing the special casing joint well above the casing shoe.

For the Case 1 configuration, the casing joint shown previously on FIG. 1 is modified as follows:

1) The threaded small hole (7) in the bottom twin whipstock of Case 1 is extended below with a tailpipe which is used first to bring the cement slurry to the shoe, during casing cementation. The bottom part of the tail pipe also includes a pump latching nipple joint.

The threaded small hole is also extended above with the female part of a polished bore receptacle to later receive a tubing stinger equipped with chevron seals, so as to extend the tailpipe upwards by a production tubing through a sealing connection.

2) The smooth bore second small hole is drilled through the bottom whipstock, to provide a flow path for the produced fluids into the oil sump below it. It may be supplemented with other small holes to provide a sufficiently large cross section for the low velocity liquid flow in the downward leg of the syphon.

The polished bore receptacles terminating the cemented drainhole liners may be omitted, the large vertical holes providing a natural guide for inserting logging or cleaning tools into the liners.

In addition, the tubing completion assembly is modified to consist of:

a) a production tubing, b) a dual string production packer, with a retrievable plug in its short string. The main purpose of that string is to provide eventual access to the sump for inserting logging or cleaning tools into the drainholes below the packer. A secondary purpose of the short string is to provide a pump by-pass flow path which may be periodically opened to let any gas accumulation below the packer escape upwards by buoyancy, while re-filling the sump with de-gassed liquid from about the packer to maintain continuity of the liquid stream through the syphon. Periodic gas purging operations may be automatically controlled from the surface. For that purpose, the retrievable plug in the short string is in fact a conventional wireline retrievable subsurface safety valve (FIG. 6a), in a normally closed position but operated by known hydraulic or electrical means whenever the presence of a small gas cap is detected below the packer. Detection means may be direct, using known liquid level sensors or indirect, by continuous monitoring of the pump efficiency. Continuous gas purging may otherwise be obtained by using a wireline plug including a permselective membrane (52), which allows continuous diffusional gas migration upwards, under a gas pressure gradient across the membrane, created by a retrievable venturi (53), located at the exit of the production tubing into the larger cross section of the casing annular space. The membrane also prevents liquid flow downwards (see FIG. 6b). In this system, the energy supplied to the pump serves three purposes:

1) to bring the gas-free liquid stream from the pump to a point above the packer, and 2) to operate a sort of gas ejector pump to re-mix the produced gas with the liquid stream in the casing/tubing annulus, above the packer.

3) to lift the mixed liquid and gas stream up the casing/tubing annulus to the separator.

Suitable permselective plug materials include, but are not limited to: charcoal, agglomerated carbon black, compressed powdered mineral adsorbents, asbestos felt, etc. . .

The long string, in the dual string packer, extends below the packer with a stinger equipped with chevron seals which is stabbed into the polished bore receptacle threaded into the top of the small hole (7) of the modified novel casing joint, thus providing a connection from the production tubing to the tailpipe, in which a pump is set.

A rod string or a power fluid tubing string is then inserted from the surface within the production tubing and connected to the pump.

In this configuration, the flow from both drainholes is discharged into the sump below the packer and flows downwards through one or several holes in the whipstock, to reach the pump inlet at the bottom of the tailpipe, to be discharged, at a higher pressure, into the production tubing and from it to the casing annulus leaking to the surface.

In cases where the cased well effluent flows into a very low pressure separator, the packer may be omitted if the production tubing extends to the surface, so that any gas coming out of solution at the apex of the syphon freely accumulates in the casing/tubing annulus, forming a low pressure gas cap extending up to the casing head. Gas purging of the casing to maintain the gas cap at the required low pressure is then accomplished through a conventional gas re-mixing valve at the surface, upstream of the low pressure separator inlet.

In the configuration of Case 2, after drilling and tie-in of the twin drainholes, a third hole is drilled vertically and its liner is cemented to provide the oil sump. The tubing completion assembly now consists only of a production tubing, a dual string packer with its short string again closed with a retrievable gas-purging plug and the production tubing and pump extending below the packer for insertion into the sump.

In the configuration of Case 4, the casing now extends below the special joint (or joints) to form the oil sump. The tubing completion assembly is the same as above: a production tubing, a dual string packer with its short string temporarily plugged off and the production tubing extending below the packer, with a bottom pump.

CASE 7 (DUAL PUMPING)

In low pressure reservoirs containing relatively high GOR oil, the risk of cavitation at the apex of the syphon may be too great, so that the use of a syphon is no longer possible. In some very heterogeneous reservoirs, it is also possible that the productivity indices of the two drainholes are widely different. In those cases, it is preferable to equip each drainhole with its own pump sized to maximize total oil production. The same is true if one of the drainholes is more prone to gas coning or water coning than the other.

Figure 7:
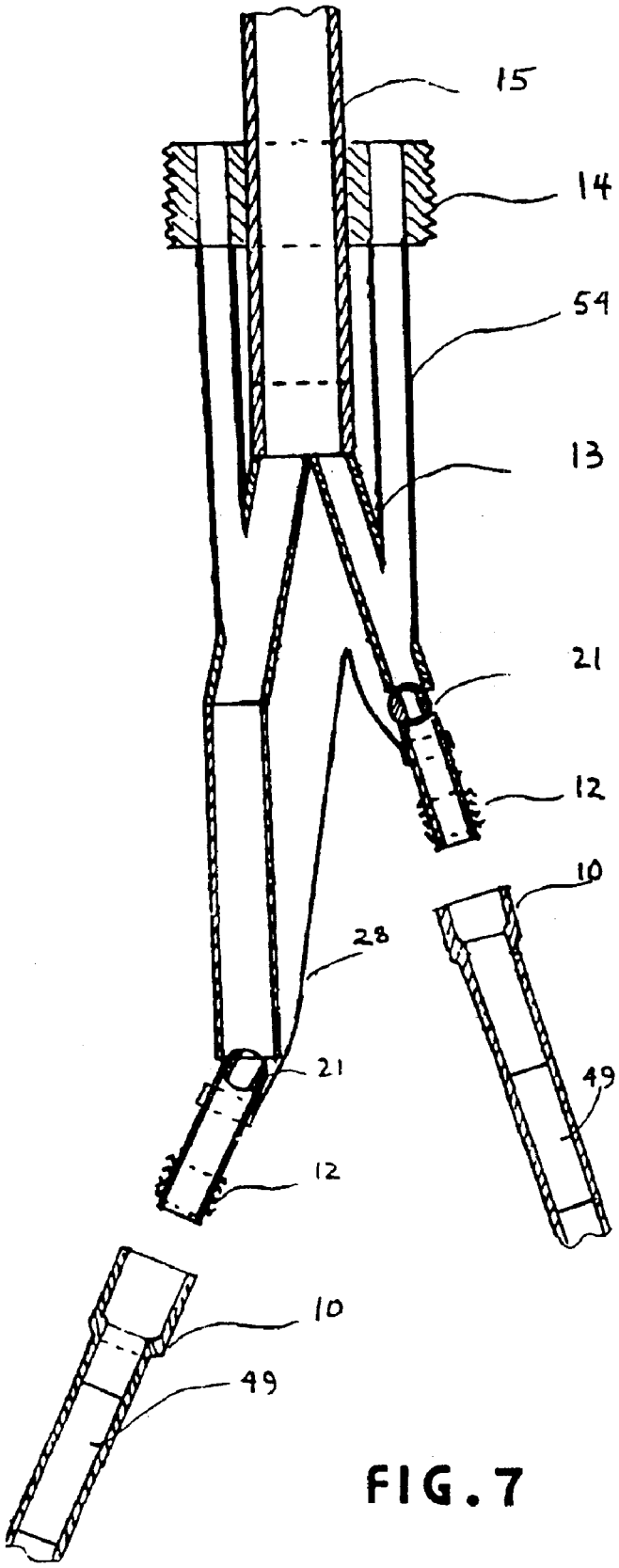
FIG. 7 is a vertical cross section of the tubing completion assembly used for dual pumps in Case 7.

Progressive cavity pumps driven by rotating rods and hydraulic or jet pumps driven by power fluid operate satisfactorily in highly deviated wells. A pump anchor nipple joint is included in the liner string, at the selected depth in the curved portion of each drainhole. The production tubing diameter must be increased to provide space inside it for the power fluid tubing strings or for the rotation rod strings. Another alternative is to insert the power fluid tubing or the rotating rod string into the drainhole liner through a side entry in each of the lower branches of the inverted Y nipple joint. In that case (see FIG. 7), a short conduit (54) leads from the top of the tubing hanger (or packer) to the side entry point to facilitate the insertion of the power fluid tubing or rod string from the annulus space into the drainhole liner. This requires corresponding modifications of the Y nipple join (13) and of the tubing hanger (14), or packer (51).

CASE 8 ("HUFF AND PUFF" MODE OF OPERATION)

Figure 8:
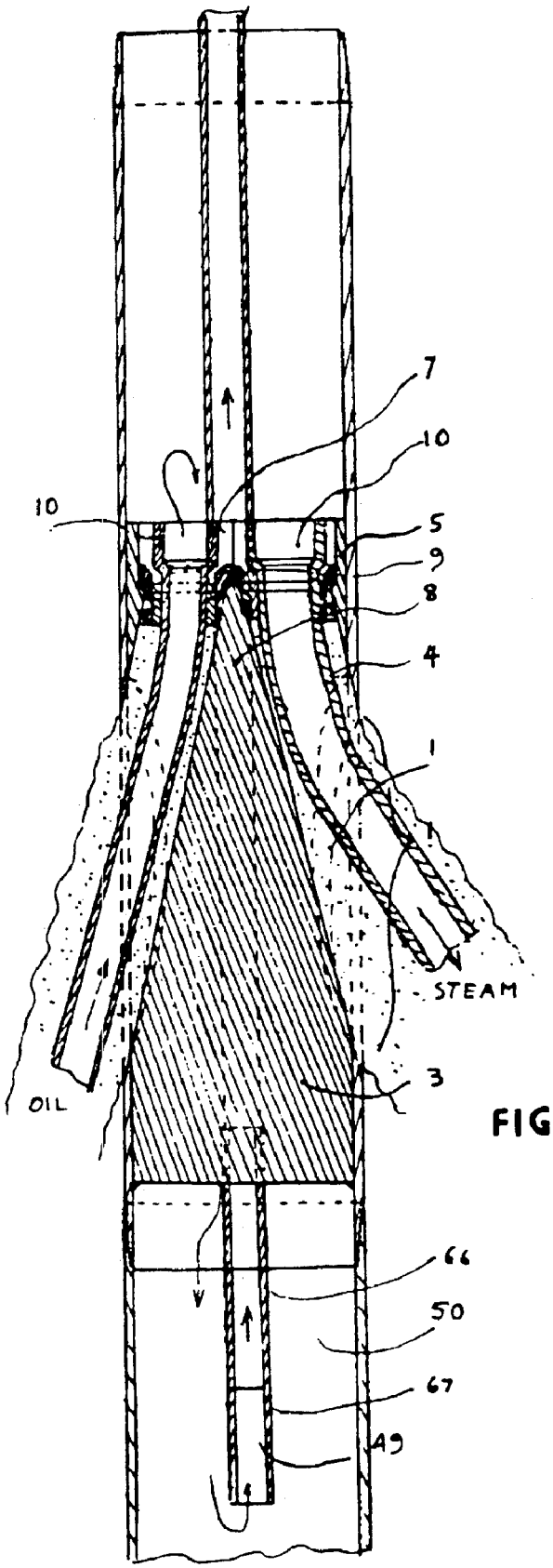
FIG. 8 and 8a are vertical cross sections of the tubing completion assembly used for Case 8, with the well tie-in configuration of Case 1.
Figure 8A:
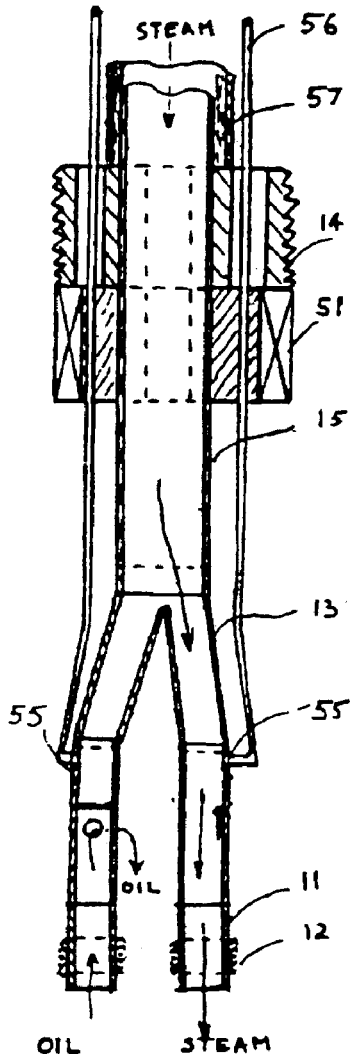

In heavy oil reservoirs, it is advantageous to operate the twin drainholes in sequential "huff and puff" stream injection, in which one drainhole is under injection while the other is under production. For surface-generated steam, the production tubing may be replaced by an insulated steam tubing. A downhole three-way retrievable valve of the upper described and claimed in U.S. Pat. No. 5,052,482 is required in each lower tubing branch below the inverted Y nipple joint. This is done (FIG. 8 and 8a) by adding a valve nipple joint (55) in each branch with its control hydraulic line (56), strapped on the outer surface of the insulated steam tubing (57). In its axial full opening position, the valve conveys steam from the tubing to the corresponding drainhole. In its side opening position, the valve discharges the production stream from the drainhole liner into the casing annulus space. From there, the produced fluid may be pumped to the surface or gas-lifted.

The same well completion type is also applicable to reservoirs subjected to "huff and puff" injection of solvent gases, such as CO2, which are known to also reduce oil viscosity, but to a lesser degree than steam injection. In such cases, artificial lift of the produced fluids may be unnecessary.

If the reservoir pressure and/or produced GOR are sufficient to bring the oil up to the kick-off point of each drainhole, the pump is hung in the annulus casing/steam tubing, above the kick-off points.

If, however, the heavy oil reservoir is also under-pressured, as, for instance in California's Midway Sunset field, the pump may be located at the bottom of an oil sump as in Case 6 or it may be located within each drainhole liner as in Case 7. The tubing completion will be modified accordingly, as will be shown later. The type of pump used in that case must allow easy disconnection from its seat, when the drainhole is switched from the production mode to the injection mode. For this reason, jet pumps, hydraulic pumps and progressive cavity pumps are preferred in that case.

For under-pressured heavy oil reservoirs in which the drainhole production flows through a syphon (Case 6), the tubing completion assembly in which telescopic or articulated connector tubes are used to connect the steam tubing to the drainholes, the packer may be a three or four string packer, depending upon the locations of the inverted Y nipple joint with respect to the packer. With the Y nipple joint below the packer, only three strings are connected to the bottom face of the packer:the upper branch of the Y, the production tubing extending into the oil sump and the short string with its retrievable plug. To increase the packer depth, and, correspondingly that of the apex of the syphon, the inverted Y nipple joint is located above a four string packer, in which two of the strings are connected to the lower branches of the inverted Y, the third string is connected to the production tubing extending into the oil sump and the fourth string is the temporarily plugged-off pump by-pass. The production tubing may end just above the packer without reaching the surface, if the production stream flows through the casing/steam tubing annulus.

With steam generated downhole, together with permanent gases (CH4, H2) using the equipment described and claimed in U.S. Pat. No. 5,052,482, it is preferably to inject the steam and gases through the side opening of the downhole three-way valve into one drainhole, while conveying the production stream from the other drainhole to the central production tubing through the axial full opening of its downhole valve. The equipment and procedures for drilling, gravel packing, cementation, tie-in of multiple drainholes and for their tubing completion, previously described, are also applicable with some minor modifications which will be indicated later.

It will be apparent to those skilled in the art of oil well design that it is not possible to cover all the situations encountered in all reservoirs, because of their infinite diversity, but that the equipment and procedures described herein lend themselves to a very large number of combinations and permutations, which are capable of addressing most situations in which multiple horizontal drainholes may be advantageously used. Such combinations and permutations, which are obvious to those skilled in the art, do not detract from the spirit of the present invention and are included in it.

RE-ENTRY INTO AN EXISTING CASED WELL (WORK-OVER)

The cost of drilling and cementing the vertical cased well is a large portion of the total cost of a well presenting the general configurations described above. Re-entry into an existing cased well for drilling, gravel-packing, cementation and liner tie-in of multiple drainholes is a cost-effective way of increasing productivity.

If the existing cased well already presents a suitable deviation for the sue of Case 3 procedures, the absence of a pre-established window in the casing spring may be remedied by milling a side-track window using available tapered mills guided by the novel retrievable whipstock latched in a drillable whipstock packer set slightly above the deviation depth. The procedures and equipment, other than the special casing joint, are then the same as in Case 3, provided that known downhole orientation surveying methods are used to remedy the absence of pre-determined alignment keys or grooves in the casing.

In most fields, however, the existing casing will be essentially vertical, so Cases 1, 2, 4, 6, 7 and 8 will be more relevant.

CASE 1a (TWIN WHIPSTOCK INSERT)

Figure 9:
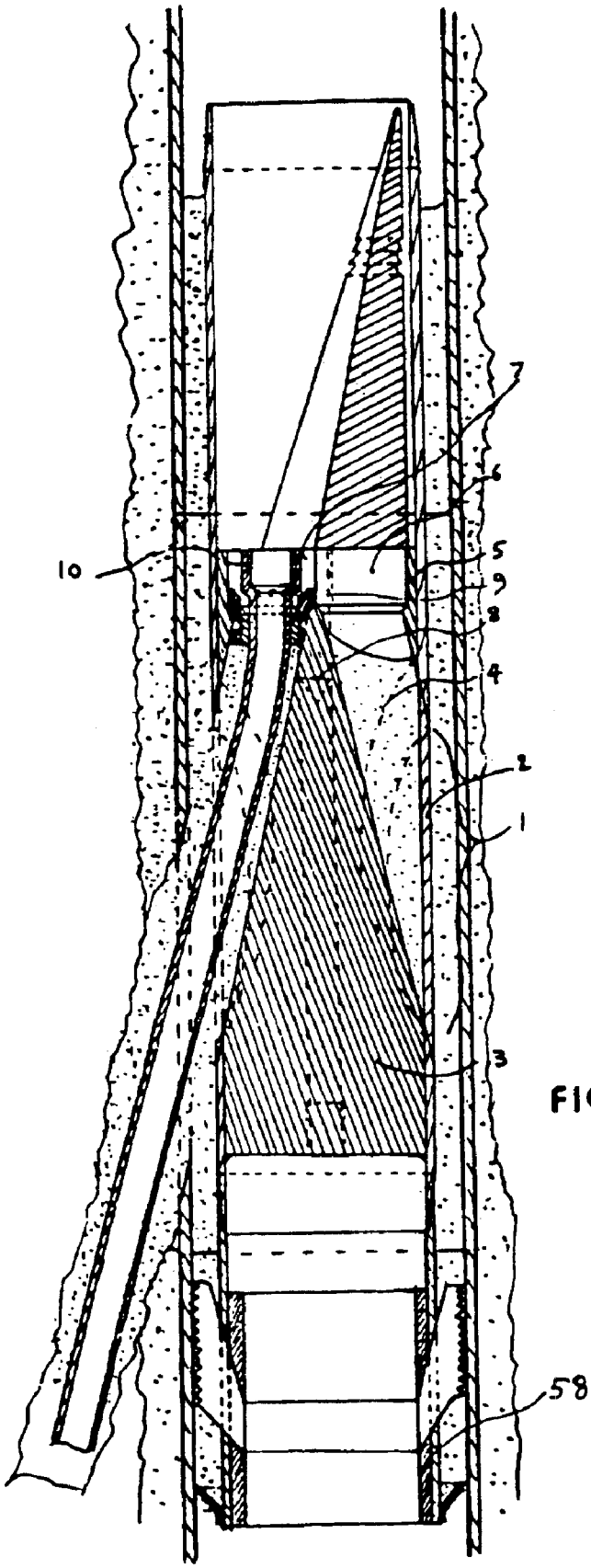
FIG. 9 and 9a are vertical cross sections of the special casing insert of Case 1a and 3a respectively.

The procedures of Case 1 may be used if a twin whipstock insert of diameter less than the drift diameter of the existing casing is run-in, hung in the casing and cemented at the selected depth above a plug permanently set in the casing. The oriented insert (FIG. 9), is held by a known packer/hanger (58) set hydraulically or by wireline tools. The hanger's slips are preferably located in the lower part of the insert below the drainholes so as to avoid any interference with them. Here again, elliptical windows will be milled in the existing casing using tapered mills guided by the twin whipstock (3).

In another embodiment (FIG. 9a), the hanger slips are located above the twin whipstock, so that the casing may be entirely milled over the depth interval of the windows, covered by the twin whipstock (3).

CASE 2a (TWIN DEVIATED HOLES THROUGH MILLED CASING INTERVAL)

Figure 9A:
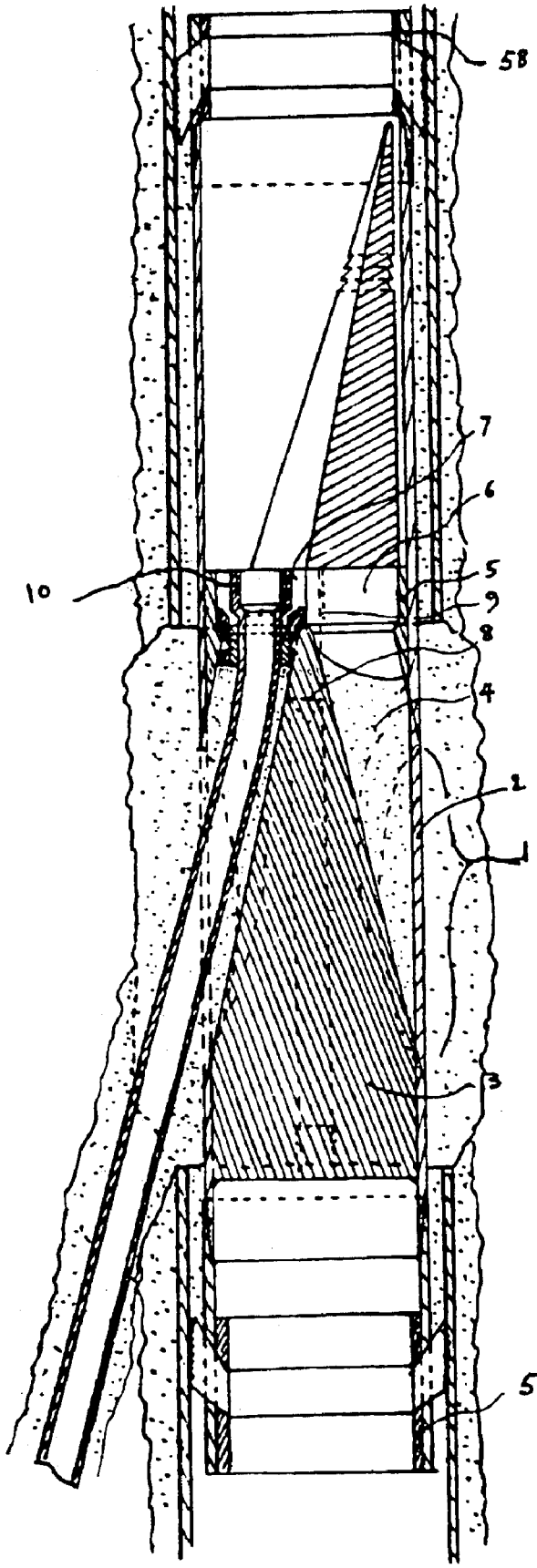

The plugged casing is milled over an interval sufficient to drill the sidetracked starting holes of Case 2 (FIG. 9a). Starting of the holes with a bent sub/downhole motor assembly may again be facilitated by first under-reaming that interval. Following these preliminary operations, the work proceeds as in Case 2, using the same equipment, tools and procedures. It will be apparent to those skilled in the art that the use of coiled tubing as liners and their subsequent in-situ mechanical slotting are equally applicable to any other case.

CASE 4a (STACKED DRAINHOLES IN MILLED CASING)

The existing casing is milled out and the hole is under-reamed to a diameter of about 30 in. over the depth intervals corresponding respectively to each drainhole start. A casing patch is then run-in and fastened to the casing by means of hanger slips (59) above and below the lower milled-out interval. This embodiment is shown on FIG. 10.

The casing patch presents close similarities with the special casing joint of Case 4, except that its outside diameter must be less than the drift diameter of the existing casing and that its outer surface, opposite the plugged telescopic stub (39) is now covered by an external rubber packer (60), which, when inflated with cement slurry entirely fills the reamed cavity. A suitable device including shearing disks also allows to inject the cement slurry in the two overlap (61) annular spaces between casing and casing patch hangers (14) above and below the cement-filled bladder, during the hydraulically-controlled extension of the stub into the slurry filling the rubber bladder. As in Case 4, the stub (39) is supported and guided during its extension by a fixed guiding cage (41) and a mobile inner guide (42) which penetrates only half way outside the casing. Added support and guidance is also provided by several cables (62) attached to the rubber wall and pulled under hydraulically-controlled tension from a drillable drum (63) through inclined holes (64) in the casing patch wall, at various locations around the machined edge of the elliptical window (1) through which the stub is extended.

With the rubber bladder fully inflated and pressed against the reamed cavity wall (40), the taught cables provide additional guidance and support to the stub (39) in its fully extended position. The drillable guides and the tail-end drillable collar (35) of the stub are drilled-out after the cement has set. This restores the vertical cased well to a diameter equal to that of the casing patch drift diameter.

A second casing patch is run-in, oriented, hung and cemented, with full extension of the second stub into the upper reamed interval, thus providing the start for the second drainhole.

Drilling, gravel packing, liner hanging and cementing procedures for both drainholes are identical with those of Case 4. The tubing completion assembly equipment and procedures are also the same.

The embodiment of Case 4 in which tie-in of the drainholes is by means of intermediate liners inserted and cemented in side-tracked holes drilled through elliptical windows by guiding the bit with a retrievable whipstock set in a drillable whipstock packer may also be adapted. The absence of pre-established windows plugged with drillable metal may be remedied in several ways.

The first method calls for milling each elliptical window into the existing casing with a tapered mill guided by a suitable retrievable whipstock. The whipstock required to mill the lowest window and to drill and complete the lowest drainhole is set and oriented in a packer, as in Case 2a. The whipstocks used to mill the other windows may then be stacked, each into the adjacent lower whipstock and oriented with respect to it by inserting into it multiple prongs, in a way similar to that used for the top whipstock of Case 1. The order in which stacked holes are drilled and completed may be either from the bottom up or from the top down. In an alternative procedure, the supporting packer is released after completion of each hole or drainhole and successively reset and re-oriented at a different depth for each of the other holes or drainholes. Again the whipstocks are handled by appropriate overshot latching tools, preferably equipped with end milling cutters to remove any protruding obstruction.

Figure 11:
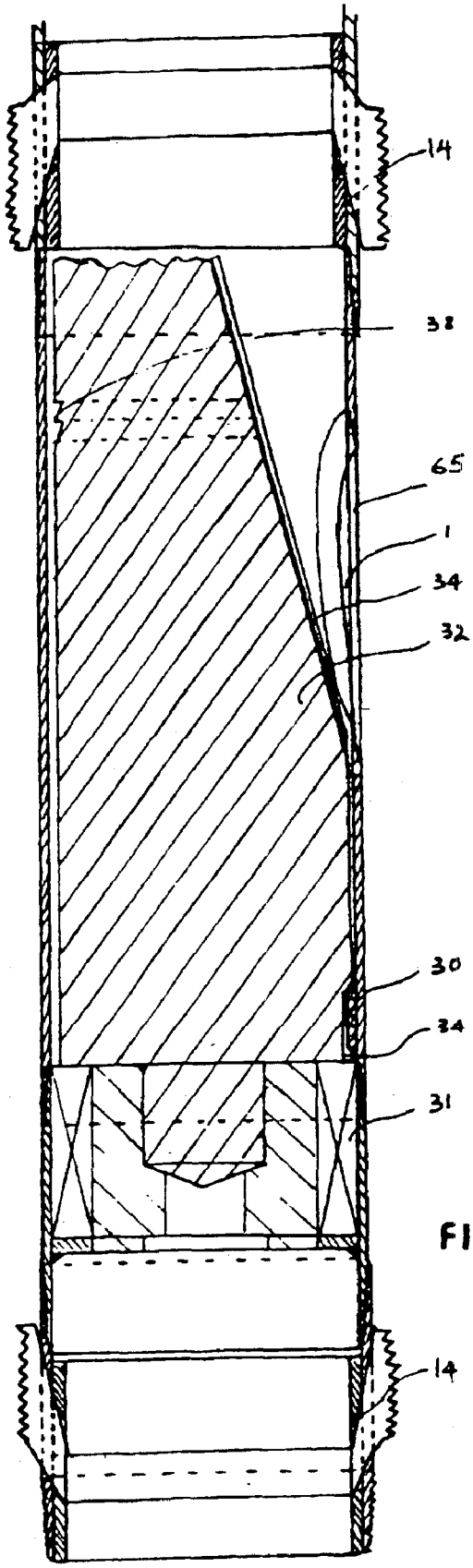
FIG. 11 is a schematic vertical cross section of the novel casing patch used for side-tracking and cementing intermediate liners in case 4a (second embodiment).

The second method again uses a special casing patch, shown on FIG. 11, with an open elliptical window (65). The casing patch is set in the casing by slips above and below an interval over which the casing was milled out. The casing patch includes a pre-oriented whipstock packer (31) in its lower part. It may also be run-in with the retrievable whipstock (32) already in place. After setting the hanger slips (14), the drilling bit and drill string, guided by the whipstock through the open elliptical window, are used to drill the side-tracked hole and operations continue as in Case 4.

This is the preferred embodiment for deep wells, because it provides the largest diameter drainholes, for the minimum casing diameter, provided that cementation problems are not likely in the type of formation existing at the drainholes kick-off points.

CASE 6a (FLOW THROUGH A SYPHON IN EXISTING CASING)

The existing casing, with its perforations plugged off, constitutes the oil sump required as the downwards leg of the syphon (see FIG. 11). The production tubing must extend to the bottom of the sump, where the pump is located, as in Case 6.

Drilling, gravel packing, tie-in and cementing of the drainholes may be obtained by any of the methods described in Cases 1a, 2a, and 4a.

For instance, the twin whipstock used in Case 1a includes a flow-through hole connected to a tail pipe (66) equipped with a pump receiver nipple joint (67) at the bottom. The upper face of the hole also serves to receive one of the alignment pins (8) of the retrievable top whipstock. This hole is also terminated by a polished bore receptacle (10) in which the production tubing stinger, equipped with chevron seals, will be stabbed prior to setting the packer, as in Case 6.

The only difference is that a casing patch is now used instead of a special casing joint. Hangers (14) are used instead of threaded connections.

The tubing completion assembly and its installation procedures are identical with those of Case 6.

Using the drainhole drilling and tie-in method of Case 2a, the only modification required is the drilling of a vertical hole through the cement and drillable casing plug after cementation of the two intermediate liners, to provide access into the oil sump through which the production tubing will be inserted. The tubing completion assembly of Case 6 is simplified because the tail pipe terminated with its pump anchoring nipple joint is threaded directly into the bottom face of the dual string packer.

The drainhole drilling and tie-in procedures of Case 4a remain unchanged, but the tubing completion assembly is the same as in Case 6.

CASE 7a (DUAL PUMPING IN WORK-OVER WELL)

The production tubing assembly is the same as in Case 7. It can be used with any of the well configurations resulting from the drainhole drilling and tie-in methods of Cases 1a, 2a and 4a.

CASE 8a ("HUFF AND PUFF" MODE OF OPERATION IN WORK-OVER WELL)

Figure 12:
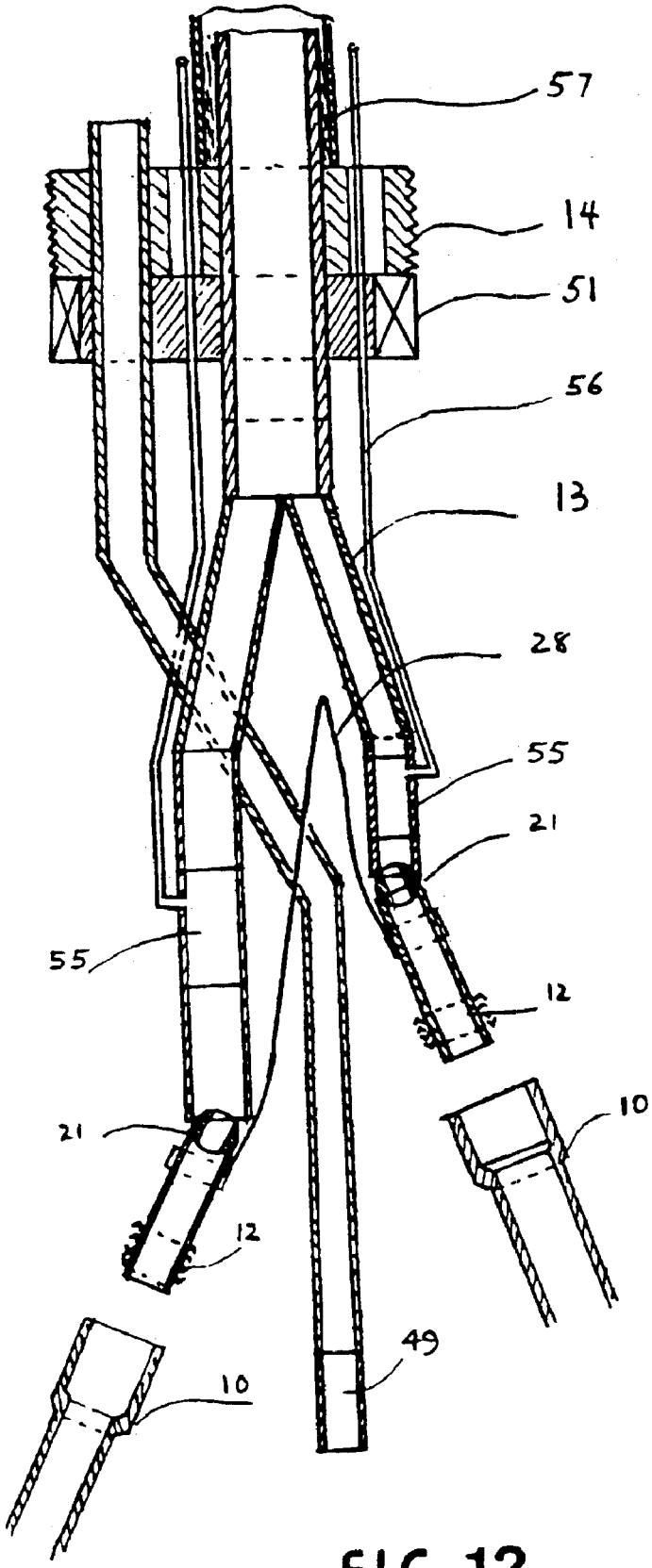
FIG. 12 is a schematic vertical cross section of the tubing completion assembly including two articulated connector tubes for Case 8a when an oil sump is used.

The tubing completion assembly is similar to that in Case 8. (see FIG. 12). In principle, all the drilling and tie-in methods of Cases 1a, 2a and 4a are applicable, provided that the inside diameter of the insert or casing patch is sufficient to accommodate two drainhole tubing strings below the packer, when the pump is located above the packer, and three tubing strings when pumping is through a syphon.

With the two drainholes operated in "huff and puff" known downhole wireline retrievable three-way valves are also included in the tubings in a valve nipple joint. The valve nipple joints (55), connected to the lower branches of the Y are then below the hanger, so their hydraulic control lines (56) also pass through and extend below the hanger (14).

Figure 13:
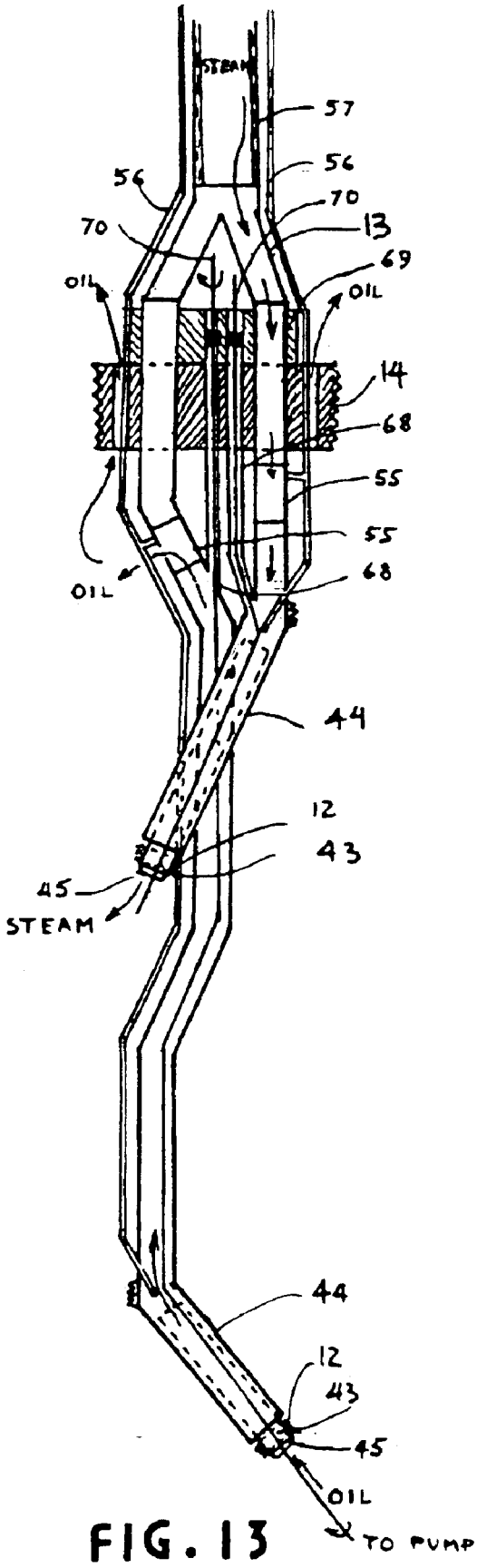
FIG. 13 is a schematic vertical cross section of the upper part of the tubing completion assembly for "huff and puff" steam injection of Cases 8 and 8a when dual pumps and a 4 string hanger are used.

If dual pumps located in the drainholes are used (see FIG. 13), the one located in the injection drainhole is pulled out of its seat (e. g. a progressive cavity pump) or pumped out (e. g. a casing-free type jet pump) prior to switching the drainhole to the injection mode. Each type of pump is actuated through its own side entry conduit The side entry of the rod string or that of the power fluid tubing is always located below the valve nipple, so as not to interfere with the valve operation while unseating the pump.

The pumped production stream in the annulus between liner and rod string is discharged through the side port of the valve into the casing/injection tubing annulus. A casing packer is no longer required, but a 3 or 4 string hanger (69) is used instead. When the Y nipple joint is below the hanger, three strings are required, respectively connected to:—the upper branch of the Y, both of the side-entry conduits (68) through which the rotating rod strings (70) driving progressive cavity pumps are inserted.

When hydraulic or jet pumps are used, the power fluid, pumped from the surface through a single tubing stabbed into a receptacle above the hanger is also fed to the pumps in all drainhole liners by means of twin conduits leading respectively to each of the two side entry points. It is through those conduits that smaller power fluid tubings are inserted into the drainhole liners, with a pump linked to each of them. The production stream from each drainhole, mixed with the spent power fluid is then discharged into the annulaus between liner and power fluid tubing to ultimately reach the casing annulus where it is commingled with that of the other drainholes and conveyed to the surface.

When the the Y nipple joint is above the hanger, the valve nipples may then also be above the hanger, together with their control lines. On the other hand, the two lower branches of the Y and the corresponding two side entry conduits require that a 4 string hanger be used.

In all cases, however, the tubing completion assembly may be run-in and set in the casing in a single trip, even in the most complex configurations of Cases 8 or 8a.

I claim:

[1. Apparatus for completing a multi-branch cased well for oil recovery by sequential cyclic steam injection methods and for petroleum production from non-uniformly-pressured heterogeneous reservoirs through medium curvature, liner-equipped, horizontal drainholes;

said apparatus includes downhole equipment, tools and devices for making casing/liner and liner tubing sealed connections and individual liner/drainhole flow connections, comprising:

a) a special steel casing joint equipped with a hard metal multi-channel whipstock permanently affixed to and sealed in said casing joint by means of an upper guide plate presenting at least two small feed-through vertical holes, one of which terminated at both ends by threaded connections, and two larger vertical holes, each leading to a slanted cylindrical curved channel partly filled with a cement plug and each said channel leading to an elliptical window machined in a direction slanted downwards at a pre-selected kick-off angle into the wall of said casing joint and plugged by a drillable plate conforming with the outer surface of said casing joint, b) a retrievable wedge-type top whipstock tool whose base presents at least two alignment pins or prongs fitting into said guide plate small holes, in which they are held by releasable latches, said top whipstock's outer lateral surface presenting at least one latching recess for its removal using an overshot tool, c) an overshot tool equipped with releasable hooks to pull out, re-orient and reset said top whipstock, in the same trip, d) a steel liner inserted in a drainhole drilled through each said whipstock channel, said liner hung with devices resisting liner weight and thermal expansion forces applied to said liner from above as well as from below and said liner permanently sealed into said channel by a pressure-sealing device including a heat-resistant seal, in addition to thermal cement, e) a tubing completion assembly conveying production fluids from a drainhole to the surface and steam from the surface to a drainhole; wherein said tubing completion assembly is terminated, at its lower end, by a heat-resistant, pressure-tight, multiple-breakable-sealed connecting device wherein two pairs of vertical tubular connector prongs, equipped with releasable high-temperature-sealing devices, respectively fit into the two larger holes and into the two smaller holes in the guide plate of said special casing joint, to respectively convey production fluids from a drainhole to said tubing assembly and steam from a known three-way valve to the other drainhole, f) a hydraulically-operated slot-cutting tool for selectively perforating said drainhole liner to establish a flow connection between a surrounding oil reservoir and said liner in its uncemented lower part.]

[2. Apparatus for completing a multi-branch cased well for oil recovery by sequential cyclic steam injection methods and for petroleum production from non-uniformly-pressured heterogeneous reservoirs through medium curvature, liner equipped, horizontal drainhole;

said apparatus includes downhole equipment, tools and devices for making casing/liner and liner/tubing sealed connections and individual liner/drainhole flow connections, comprising:

a) a special steel cylindrical casing joint presenting an elliptical side window machined at a prescribed small downwards kick-off angle and covered by a drillable metal plate shaped to conform with the outer surface of said casing joint which is also equipped with a drillable orientation device comprising a vertical key or groove, b) a drillable support and pakcer affixed in said casing joint by slips below said window, c) a retrievable single-channel whipstock tool set within said packer in accordance with a matching orientation device;

said whipstock presents at least one guiding groove on its slanted surface and at least one latching recess on its cylindrical surface, d) a short intermediate steel liner of a diameter slightly smaller than said window's short axis, allowing its insertion into a kicked-off hole, through the window and wherein the upper end of said intermediate liner is equipped with a pressure-sealing gasketed drillable collar shaped to conform both with the inner surface of the casing joint along the edge of the window and with said guiding groove in the whipstock, so that said gasketed end, when pressed against the the inner surface of the casing joint, provides a permanent high-temperature seal in addition to thermal cement around said intermediate liner, e) an overshot tool, equipped internally with at least one spring-loaded hook to latch into the whipstock's latching recess or key and pull it out; said tool also presents at its lower end some milling cutters, for surfacing the liner's drillable collar and for drilling-out the packer slips and support, and said tool includes a latching device, for pulling-out the drilled-out packer;

f) a selectively perforated drainhole steel liner inserted in a drainhole drilled through such intermediate liner, hung from above as well as from below and cemented in the lower part of said intermediate liner, and having the annular space between intermediate liner and drainhole line sealed with an inflatable packer, g) a tubing completion assemlby conveying production fluids from a drainhole to the surface and steam from the surface to a drainhole, wherein said tubing completoin is terminated at its lower end by a heat-resistant, pressure-tight, multiple-breakable-sealed connecting device wherein several articulated connector steel tubes are each inserted into the upper part of the intermediate liner of a drainhole, and the annular space between the inner surface of said intermediate liner and said connector tube is sealed by an inflatable thermal packer, h) a hydraulically-operated slot-cutting tool for selectively perforating the uncemented lower part of each drainhole liner.]

[3. Apparatus for completing a multi-branch cased well for oil recovery by sequential cyclic steam injection methods and for petroleum production from non-uniformly-pressured heterogeneous resevoirs through medium curvature, liner-equipped, horizontal drainholes;

said apparatus includes downhole eqiupment, tool and devices for making multiple casing/liner and liner/ tubing sealed connections and individual liner/drainhole flow connections, comprising:

a) at least one special casing joint in the casing string of a vertical hole, opposite a reamed interval straddling the kick-off points of one or more drainholes, said joint presenting one or more elliptical windows oriented downwards and facing pre-selected kick-off directions at various depths, b) a telescopic steel line stub closed at its lower end by a drillable metal plate plugging each window, and machined at both ends to conform respectively with the outer surface of the casing window for the lower end and with the inner surface of the casing window for the upper end, c) two drillable metal guide cages supporting said stub, inclined at the kick-off angle, with one of the two guide cages affixed inside the casing joint by drillable fasteners while the other, freely inserted into the stub, is mobile and can slide within said fixed guide over an interval equal to a fraction of the stub length, d) a drillable gasketed collar affixed to the stub's upper end to prevent said telescopic stub's upper end from popping out through the window into the reamed cavity when the stub is extended by increasing the hydraulic pressure in the casing with respect to that of the annulus during cementation of the casing string and of each extended stub, with a cement slurry displaced behind the casing and wherein said gasketed collar presents at least one guiding key or groove sliding along a bar of the fixed guide cage, to prevent any rotation of the stub around its axis, e) a steel liner inserted in a drainhole drilled through such a liner stub, permanently hung by a dual hanger's opposing slips into said stub and sealed with a high-temperature pressure-sealing device, in addition to thermal cement, f) a tubing completion assembly, conveying production fluids from a drainhole to the surface and steam from the surface to a drainhole, having at its lower end a heat-resistant, pressure-tight, multiple-breakable-sealed connecting device wherein telescopic connector steel tubes inclined at the kick-off angle are facing each window, with the tube's lower end equipped with a high-temperature sealing device insertable into the upper part of the window's stub and set when said connector tube is in its extended position, whereas the upper end of said tube is equipped with a movable sliding seal remaining within a cylindrical cavity of said tubing completion assembly, g) a hydraulically-operated slot-cutting tool for selectively perforating the uncemented lower part of each drainhole liner.]

[4. The apparatus for completing a multi-branch cased well of claims 1, 2 or 3 wherein the hydraulically-operated slot-cutting tool comprises:

a) a cylindrical tool body inserted into said drainhole liner wherein a plurality of cutting wheels, each one mounted on a perpendicular axis to that of said body, at the end of an hydraulically-operated articulated arm, are periodically pressed into the inner surface of said liner wall, which they penetrate, by large forces applied only when the arms are extended by the displacement of a spring-loaded hydraulic piston sliding in a pressurized liquid-filled cylinder, b) a source of periodic hydraulic fluid pressure at the surface, c) a coiled tubing of smaller diameter than that of said drainhole liner, connecting said cylindrical body to said pressure source and providing a mechanical link to the surface, to inset and pull-out the tool body through the liner, thus causing each cutting wheel to cut a slot into the liner wall, substantially parallel to the axis of said liner, while the arms are kept in their extended position, but leaving the liner wall intact when the arms are brought into their retracted position along the tool body.]

[5. The apparatus for completing a multi-branch cased well of claim 3, wherein the tubing completion assembly comprises a multiple-breakable-sealed connecting device presenting at least two slightly inclined fixed branches, each one terminated by a connector tube assembly equippped at its end-with a known sealing device, taken from a list comprising: thermal packings, O rings and metal/metal seals, to provide a breakable pressure-seal against the inner surfaces of said casing/liners's connecting device;

said connector tube assembly comprises:

a) a cylindrical body with its upper end connected to a tubing and forming with said tubing an angle equal to that formed by the casing/liner connecting device and the casing, and said upper end equipped with anchoring means to fasten it to the inner surface of the casing, b) a connector steel tube sliding through said cylindrical body under the surface-controlled pressure of a hydraulical fluid which also compresses a spring against an arrestor ring, to provide a spring-loaded, high-temperature end seal of said connector tube when in its extended position, c) a wireline-releasable mechanical latch maintaining said spring under compression after the hydraulic pressure has been released.

d) means for latching a suitable retrieval wireline tool to the tail end of said connector tube to retract it and to latch it into said body in its retracted position, in the event that the whole tubing completion assembly has to be pulled out for inspection or repairs, e) a packing-type, high-temperature lateral seal in the annulus between said cylindrical body and the tube within said connector tube assembly, providing a breakable pressure-sealed flow connection between said liner and said tubing, f) a packing-type, heat-resistant seal around said connector tube, above said end seal, providing an additional pressure-seal against the inner surface of the casing/liner connecting device in which the connector tube is inserted.]

[6. The apparatus for completing a multi-branch cased well according to claims 1, 2 or 3 further comprising a downhole pump and means for preventing pump cavitation and gas lock in the tubing completion assemblies, when they convey gassy or boiling production fluids to the surface;

said means comprising:

1) a vertical sump, closed at its top by a conventional multi-string tubings/casing packer and connected to said multiple drainholes, and wherein the absolute flowing pressure of said produced fluids, at the point of highest elevation in the flow path from the drainholes to said sump, may drop below the bubble point absolute pressure of said fluids, a situation resulting in gases being evolved or coming out of solution to form a gas pocket which interrupts the flow of liquids from said drainholes into the sump pump, 2) a wireline-retrievable gas-purging device suitable for latching into the short string of the multi-string packer located at the top of the sump, wherein said device is taken from a downhole equipment list comprising:

a) a normally closed subsurface valve whose opening is controlled by a fluid level sensor at the top of said oil sump to periodically purge into the compartment above said packer any gas phase accumulating above a predetermined fluid level depth, b) a wireline-retrievable plug in said packer, comprising a permselective membrane permeable to diffusing gas but impervious to liquid flow, for continuously purging of said gas phase, under a gas pressure gradient, c) a venturi in the pump-discharged liquid production stream flowing through a string adjacent to said plug in said multi-spring packer, at its exit into an enlarged flow cross section above said packer, which is equipped with a gas flow connection between the side of said venturi and the upper face of said membrane, to create said gas pressure gradient.]

[7. A method for drilling and completing a multi-branch cased well for oil recovery by sequential cyclic steam injection methods and for petroleum production from non-uniformly pressured heterogeneous reservoirs through medium-curvature, liner-equipped, horizontal drainholes, wherein casing/liner connections are permanently-sealed, wherein liner/tubing are connected by breakable-seals, and comprises the following steps:

a) drilling a pair of short deviated boreholes through the bottom of said vertical well casing, b) inserting in said pair of drainholes two short intermediate steel liners using a work string ended with an inverted Y nipple joint, two articulated nipple joints, each one equipped with a rubber cementing seal cup, and holding said intermediate liner with a releasable latch, c) stab-in cementing of said two short intermediate liners using said work string as cementing string, with sufficient overlap of a special high-temperature resin cement in the casing to provide a permanent gas-tight thermal tie-in of the casing with each intermediate liner, d) drilling successively each drainhole through each intermediate liner, e) running a coiled-tubing steel liner through each said intermediate liner into said drilled drainhole, affixing it to the intermediate liner with a dual hanger's opposing slips and with a high-temperature pressure-sealing device prior to cementing its upper end to the intermediate liner's lower end, with a known thermal cement, f) connecting the upper part of each intermediate liner to the lower end of a tubing assembly equipped with a heat-resistant pressure-tight, multiple-breakable-sealed connecting device, g) selectively perforating the uncemented lower part of said coiled tubing liner "in situ" using a hydraulically-operated slot-cutting tool at the end of a smaller-diameter coiled-tubing run-in from the surface and inserted through said tubing assembly and intermediate liner into said drainhole liner.]

*8. A method for sealing the intersection between a first borehole and a second borehole comprising the steps of:*

*positioning a first tubular member in a first borehole, said first tubular member having a first pre-formed opening therein;*

*positioning a diverter having an alignment groove below the first pre-formed opening so that a second borehole may be drilled from the first borehole through the first pre-formed opening;*

*drilling a second borehole from the first borehole through the first pre-formed opening in the first tubular member; and*

*diverting a second tubular member through the first borehole and into the second borehole using the diverter, the second tubular member having a flange at one end and a protrusion on the flange that matches the alignment groove in the diverter to orient and guide the second tubular member and flange to the first pre-formed opening and wherein the second tubular member extends into the second borehole and the flange resides in the first borehole and contacts the periphery of the first pre-formed opening to seal the opening.*

*9. The method of claim 8 further comprising the step of cementing the first tubular member in the first borehole.*

*10. The method of claim 9 further comprising the step of cementing the second tubular member in the second borehole.*

*11. The method of claim 10 further comprising the step of removing at least a portion of the second tubular member flange residing in the first borehole.*

*12. The method of claim 8 wherein the first pre-formed opening in the first tubular member is covered during the step of positioning the first tubular member in the first borehole.*

*13. The method of claim 8 wherein the first tubular member has a second pre-formed opening therein to provide an opening for drilling a third borehole from the first borehole.*

*14. The method of claim 13 wherein the first pre-formed opening and second pre-formed opening in the first tubular member are covered during the step of positioning the first tubular member in the first borehole.*

*15. A method for sealing the intersection between a first borehole and a second borehole comprising the steps of:*

*positioning a first tubular member in a first borehole, said first tubular member having a first pre-formed opening therein that is covered during the step of positioning the first tubular member in the first borehole;*

*applying settable material about the first tubular member to set the first tubular member in the first borehole;*

*removing at least part of the covering on the first pre-formed opening;*

*drilling a second borehole from the first borehole through the pre-formed opening in the first tubular member;*

*installing a second tubular member through the first borehole and into the second borehole to provide communication from the second borehole to the first borehole, the second tubular member having a flange at one end wherein the flange resides in the first borehole and contacts the periphery of the first pre-formed opening to seal the opening; and*

*removing at least a portion of the flange located in the first borehole.*

*16. The method of claim 15 wherein the first tubular member has a second pre-formed opening therein to provide an opening for drilling a third borehole from the first borehole.*

*17. The method of claim 15 further comprising the step of setting the first tubular member in the first borehole with settable material.*

*18. The method of claim 17 further comprising the step of setting the second tubular member in the second borehole with settable material.*

*19. A method for sealing the intersection between a first borehole and a second borehole comprising the steps of:*

*positioning a first tubular member in a first borehole, said first tubular member having a first pre-formed opening therein;*

*drilling a second borehole from the first borehole through the first pre-formed opening in the first tubular member;*

*installing a second tubular member through the first borehole and into the second borehole, the second tubular member having a flange at one end wherein the second tubular member extends into the second borehole and the flange resides in the first borehole and contacts the periphery of the first pre-formed opening to seal the opening;*

*cementing the first tubular member in the first borehole; and*

*cementing the second tubular member in the second borehole.*

*20. The method of claim 19 further comprising the step of removing at least a portion of the second tubular member flange residing in the first borehole.*

*21. A method for sealing the intersection between a first borehole and a second borehole comprising the steps of:*

*positioning a first tubular member in a first borehole, said first tubular member having a first pre-formed opening therein;*

*drilling a second borehole from the first borehole through the first pre-formed opening in the first tubular member;*

*installing a second tubular member through the first borehole and into the second borehole, the second tubular member having a flange at one end wherein the second tubular member extends into the second borehole and the flange resides in the first borehole and contacts the periphery of the first pre-formed opening to seal the opening; and*

*installing a third tubular member through the second tubular member and into the second borehole to permit passage of oil.*

*22. The method of claim 21 further comprising the step of applying settable material to the first tubular member to set the first tubular member in the first borehole.*

*23. The method of claim 22 further comprising the step of applying settable material to the second tubular member to set the second tubular member in the second borehole.*

*24. The method of claim 23 further comprising the step of removing at least a portion of the second tubular member flange residing in the first borehole.*

*25. The method of claim 24 wherein the first tubular member has a second pre-formed opening therein to provide an opening for drilling a third borehole from the first borehole.*

* * * * *